US011862077B2

(12) United States Patent
Yang et al.

(10) Patent No.: US 11,862,077 B2
(45) Date of Patent: Jan. 2, 2024

(54) METHOD FOR IMPROVING IMAGE DISPLAY QUALITY, TIMING CONTROLLER AND DISPLAY APPARATUS

(71) Applicant: BOE TECHNOLOGY GROUP CO., LTD., Beijing (CN)

(72) Inventors: Fei Yang, Beijing (CN); Yu Wang, Beijing (CN)

(73) Assignee: Boe Technology Group Co., LTD., Beijing (CN)

( * ) Notice: Subject to any disclaimer, the term of this patent is extended or adjusted under 35 U.S.C. 154(b) by 0 days.

(21) Appl. No.: 17/780,796

(22) PCT Filed: Mar. 9, 2021

(86) PCT No.: PCT/CN2021/079777

§ 371 (c)(1),
(2) Date: May 27, 2022

(87) PCT Pub. No.: WO2021/218405

PCT Pub. Date: Nov. 4, 2021

(65) Prior Publication Data

US 2022/0415251 A1 Dec. 29, 2022

(30) Foreign Application Priority Data

Apr. 27, 2020 (CN) ......................... 202010346137.8

(51) Int. Cl.
*G09G 3/20* (2006.01)
*G09G 3/3208* (2016.01)
*G09G 3/36* (2006.01)

(52) U.S. Cl.
CPC ............. *G09G 3/3208* (2013.01); *G09G 3/20* (2013.01); *G09G 3/2003* (2013.01);
(Continued)

(58) Field of Classification Search
CPC ... G09G 2320/0276; G09G 2320/0673; G09G 2320/0242; G09G 2320/0626;
(Continued)

(56) References Cited

U.S. PATENT DOCUMENTS 9,087,485 B2 * 7/2015 Ahn ..................... G09G 3/3426
9,460,651 B2 * 10/2016 Chun .................. G09G 3/3208
(Continued)

FOREIGN PATENT DOCUMENTS

CN 1797533 A 7/2006
CN 101256751 A 9/2008
(Continued)

OTHER PUBLICATIONS

Office Action for the Chinese Patent Application No. 202010346137.8 issued by the Chinese Patent Office dated Dec. 22, 2020.
(Continued)

*Primary Examiner* — Dismery Mercedes
(74) *Attorney, Agent, or Firm* — IP & T GROUP LLP

(57) ABSTRACT

A method for improving image display quality, including: dividing a total gray scale range of a gamma voltage curve of a display apparatus to obtain gray scale ranges; obtaining data of gray scales of frame(s) of image to be displayed by the display apparatus, and calculating a ratio of data of gray scales in each gray scale range; adjusting a division value of a gamma voltage range corresponding to each gray scale range of the gamma voltage curve according to calculated ratios, so that a division value of a gamma voltage range corresponding to a gray scale range with a maximum ratio is less than a division value of a gamma voltage range corresponding to any remaining gray scale range; and outputting gamma voltages corresponding to the data of gray scales of the frame(s) of image to be displayed according to the adjusted gamma voltage curve.

19 Claims, 8 Drawing Sheets

(52) U.S. Cl.
CPC ....... *G09G 3/3607* (2013.01); *G09G 2310/08* (2013.01); *G09G 2320/0233* (2013.01); *G09G 2320/0242* (2013.01); *G09G 2320/0271* (2013.01); *G09G 2320/0276* (2013.01); *G09G 2320/0626* (2013.01); *G09G 2320/0666* (2013.01); *G09G 2320/0673* (2013.01); *G09G 2360/16* (2013.01)

(58) Field of Classification Search
CPC ..... G09G 2320/066; G09G 2320/0271; G09G 2320/0233; G09G 2320/0666; G09G 2330/028; G09G 2310/08; G09G 3/20; G09G 3/3208; G09G 3/2007; G09G 3/3607; G09G 3/2077; G09G 3/2003; G09G 2360/16
See application file for complete search history.

(56) References Cited

U.S. PATENT DOCUMENTS

| | | | | |
|---|---|---|---|---|
| 9,824,636 | B2* | 11/2017 | Lu | G09G 3/3406 |
| 10,325,558 | B2* | 6/2019 | Choe | G09G 3/325 |
| 11,074,882 | B2* | 7/2021 | Wang | G09G 3/3648 |
| 2002/0163490 | A1 | 11/2002 | Nose | |
| 2002/0180680 | A1* | 12/2002 | Moon | G09G 3/3696 345/89 |
| 2003/0151565 | A1 | 8/2003 | Kim et al. | |
| 2005/0088373 | A1 | 4/2005 | Lee | |
| 2006/0139270 | A1 | 6/2006 | Hong et al. | |
| 2006/0238471 | A1* | 10/2006 | Kim | G09G 5/06 345/89 |
| 2010/0073339 | A1* | 3/2010 | Lee | G09G 3/20 345/207 |
| 2011/0134152 | A1 | 6/2011 | Furihata | |
| 2011/0242149 | A1* | 10/2011 | Yoshida | G09G 3/3648 345/88 |
| 2013/0300773 | A1* | 11/2013 | Kim | G09G 5/10 345/690 |
| 2014/0225942 | A1* | 8/2014 | Liu | G09G 3/36 345/694 |
| 2014/0320546 | A1* | 10/2014 | Lim | G09G 3/3291 345/77 |
| 2015/0235618 | A1* | 8/2015 | Takahashi | G09G 5/02 345/601 |
| 2015/0262537 | A1* | 9/2015 | Huang | G09G 3/3688 345/89 |
| 2016/0196793 | A1 | 7/2016 | Xu | |
| 2017/0140692 | A1 | 5/2017 | Xiong et al. | |
| 2019/0206344 | A1 | 7/2019 | Kang | |
| 2020/0160801 | A1* | 5/2020 | Wang | H04N 1/4078 |
| 2020/0219439 | A1* | 7/2020 | Wu | G09G 3/3208 |
| 2021/0210031 | A1 | 7/2021 | Kang | |
| 2021/0280138 | A1* | 9/2021 | Yum | G09G 3/3291 |
| 2021/0295789 | A1* | 9/2021 | Kang | G09G 3/3607 |

FOREIGN PATENT DOCUMENTS

| | | | |
|---|---|---|---|
| CN | 102087841 | A | 6/2011 |
| CN | 103310752 | A | 9/2013 |
| CN | 104021767 | A | 9/2014 |
| CN | 104992683 | A | 10/2015 |
| CN | 105869567 | A | 8/2016 |
| CN | 107967900 | A | 4/2018 |
| CN | 107993624 | A | 5/2018 |
| CN | 109036262 | A | 12/2018 |
| CN | 109147689 | A | 1/2019 |
| CN | 110060618 | A | 7/2019 |
| CN | 111415616 | A | 7/2020 |
| EP | 1843320 | A1 | 10/2007 |
| EP | 2892048 | B1 | 8/2017 |
| KR | 10-2012-0059217 | A | 6/2012 |

OTHER PUBLICATIONS

Notification to Grant Patent Right for Invention for the Chinese Patent Application No. 202010346137.8 issued by the Chinese Patent Office dated Mar. 24, 2021.

* cited by examiner

METHOD FOR IMPROVING IMAGE DISPLAY QUALITY, TIMING CONTROLLER AND DISPLAY APPARATUS

CROSS-REFERENCE TO RELATED APPLICATIONS

This application is a national phase entry under 35 USC 371 of International Patent Application No. PCT/CN2021/079777, filed on Mar. 9, 2021, which claims priority to Chinese Patent Application No. 202010346137.8, filed on Apr. 27, 2020, which are incorporated herein by reference in their entirety.

TECHNICAL FIELD

The present disclosure relates to the field of display technologies, and in particular, to a method for improving image display quality, a timing controller and a display apparatus.

BACKGROUND

In the field of display, people have high demands not only for appearance and quality of display apparatuses, but also for price and practicality of the display apparatuses. Organic light-emitting diode (abbreviated as: OLED) display apparatuses have attracted wide attention due to their advantages such as wide color gamut, wide viewing angle, thinness, light weight, low energy consumption, high contrast, and being able to be bent, which meet people's requirements for the appearance, quality and practicality of the display apparatus.

SUMMARY

In an aspect, a method for improving image display quality is provided. The method for improving image display quality includes: dividing a total gray scale range of a gamma voltage curve of a display apparatus to obtain a plurality of gray scale ranges; obtaining data of gray scales of at least one frame of image to be displayed by the display apparatus, and calculating a ratio of data of gray scales in each gray scale range to the data of gray scales of the at least one frame of image to be displayed; adjusting a division value of a gamma voltage range corresponding to each gray scale range of the gamma voltage curve according to calculated ratios, so that a division value of a gamma voltage range corresponding to a gray scale range with a maximum ratio is less than a division value of a gamma voltage range corresponding to any remaining gray scale range; and outputting gamma voltages corresponding to the data of gray scales of the at least one frame of image to be displayed according to the adjusted gamma voltage curve.

In some embodiments, calculating the ratio of the data of gray scales in each gray scale range to the data of gray scales of the at least one frame of image to be displayed includes: setting a weight value corresponding to each gray scale range; counting a reference quantity of the data of gray scales in each gray scale range; calculating a weighted value of the data of gray scales in each gray scale range and a sum of weighted values corresponding to the gray scale ranges, according to the reference quantity of the data of gray scales in each gray scale range and the weight value corresponding to the gray scale range; and calculating the ratio of the data of gray scales in each gray scale range according to the weighted value of the data of gray scales in each gray scale range and the sum of the weighted values.

In some embodiments, the reference quantity is a number of the data of gray scales in each gray scale range.

In some embodiments, a product of the number of the data of gray scales in each gray scale range and the corresponding weight value of the gray scale range is approximately equal.

In some embodiments, the reference quantity is a sum of grayscale values of the data of gray scales in each gray scale range.

In some embodiments, the weight value corresponding to each gray scale range is inversely related to the sum of the grayscale values of the data of gray scales in the gray scale range.

In some embodiments, adjusting the division value of the gamma voltage range corresponding to each gray scale range of the gamma voltage curve according to the calculated ratios, so that the division value of the gamma voltage range corresponding to the gray scale range with the maximum ratio is less than the division value of the gamma voltage range corresponding to any remaining gray scale range, includes: determining the gray scale range with the maximum ratio from the calculated ratios; calculating reference gamma voltages of two end points corresponding to gray scale coordinates of two end points in the gray scale range with the maximum ratio; and calculating the division value of the gamma voltage range corresponding to the gray scale range with the maximum ratio according to a difference between the reference gamma voltages of two end points corresponding to the gray scale range with the maximum ratio and a difference between the gray scale coordinates of two end points in the gray scale range with the maximum ratio.

In some embodiments, calculating the reference gamma voltages of two end points corresponding to the gray scale coordinates of two end points in the gray scale range with the maximum ratio, includes: obtaining a luminance range that the display apparatus is capable of outputting; calculating reference luminance of two end points corresponding to the gray scale coordinates of two end points in the gray scale range with the maximum ratio according to the luminance range, a number of gray scale coordinates in the gray scale range with the maximum ratio and a total number of gray scale coordinates in the total gray scale range; and calculating voltages required to realize the reference luminance of two end points according to the reference luminance of two end points, and making the calculated two voltages be served as the reference gamma voltages of two end points corresponding to the gray scale coordinates of two end points in the gray scale range with the maximum ratio.

In some embodiments, in the adjusted gamma voltage curve, a division value of a gamma voltage range corresponding to a gray scale range with a secondary maximum ratio is less than a division value of a gamma voltage range corresponding to each gray scale range except the gray scale range with the maximum ratio and the gray scale range with the secondary maximum ratio, and is greater than the division value of the gamma voltage range corresponding to the gray scale range with the maximum ratio. Adjusting the division value of the gamma voltage range corresponding to each gray scale range of the gamma voltage curve according to the calculated ratios, so that the division value of the gamma voltage range corresponding to the gray scale range with the maximum ratio is less than the division value of the gamma voltage range corresponding to any remaining gray scale range, further includes: determining the gray scale range with the secondary maximum ratio from the calculated ratios; calculating reference gamma voltages of two end points corresponding to gray scale coordinates of two end points in the gray scale range with the secondary maximum ratio; and calculating the division value of the gamma voltage range corresponding to the gray scale range with the secondary maximum ratio according to a difference between the reference gamma voltages of two end points corresponding to the gray scale range with the secondary maximum ratio and a difference between the gray scale coordinates of two end points in the gray scale range with the secondary maximum ratio.

In some embodiments, adjusting the division value of the gamma voltage range corresponding to each gray scale range of the gamma voltage curve according to the calculated ratios, so that the division value of the gamma voltage range corresponding to the gray scale range with the maximum ratio is less than the division value of the gamma voltage range corresponding to any remaining gray scale range, further includes: calculating reference gamma voltages of two end points corresponding to gray scale coordinates of two end points in a continuous gray scale range; and calculating a division value of a gamma voltage range corresponding to the continuous gray scale range according to a difference between the reference gamma voltages of two end points corresponding to the continuous gray scale range and a difference between the gray scale coordinates of two end points in the continuous gray scale range. In a case where only the division value of the gamma voltage range corresponding to the gray scale range with the maximum ratio is calculated, the continuous gray scale range is a continuous gray scale range composed of gray scale ranges except the gray scale range with the maximum ratio in the plurality of gray scale ranges. In a case where the division value of the gamma voltage range corresponding to the gray scale range with the maximum ratio and the division value of the gamma voltage range corresponding to the gray scale range with the secondary maximum ratio are calculated, the continuous gray scale range is a continuous gray scale range composed of gray scale ranges except the gray scale range with the maximum ratio and the gray scale range with the secondary maximum ratio in the plurality of gray scale ranges.

In some embodiments, a number of the gray scale ranges obtained by dividing the total gray scale range is two to five.

In some embodiments, the number of the gray scale ranges obtained by dividing the total gray scale range is three, and the three gray scale ranges are a low gray scale range, a medium gray scale range and a high gray scale.

The method for improving image display quality, further includes: converting each of the data of gray scales of the at least one frame of image to be displayed into luminance data; and outputting a data voltage corresponding to each of the data of gray scales of the at least one frame of image to be displayed according to a gamma voltage and the luminance data corresponding to each of the data of gray scales of the at least one frame of image to be displayed.

In some embodiments, the display apparatus is an active light-emitting display apparatus. A total gamma voltage range composed of gamma voltage ranges corresponding to the plurality of gray scale ranges is a range that is obtained by subtracting the compensation voltage range from an ideal data voltage range that the display apparatus is capable of providing. The compensation voltage range is a compensation voltage range required for compensating transistors and/or active light-emitting devices of the display apparatus.

In another aspect, a timing controller is provided. The timing controller includes: a data analysis circuit, a ratio calculation circuit, and a gamma voltage calculation circuit. The data analysis circuit is configured to divide a total gray scale range of a gamma voltage curve of a display apparatus to obtain a plurality of gray scale ranges, and obtain data of gray scales of at least one frame of image to be displayed by the display apparatus. The ratio calculation circuit is coupled to the data analysis circuit and is configured to calculate a ratio of data of gray scales in each gray scale range. The gamma voltage calculation circuit is coupled to the ratio calculation circuit, and is configured to adjust the a division value of a gamma voltage range corresponding to each gray scale range in the gamma voltage curve according to calculated ratios, so that a division value of a gamma voltage range corresponding to a gray scale range with a maximum ratio is less than a division value of a gamma voltage range corresponding to any remaining gray scale range; and output gamma voltages corresponding to the data of gray scales of the at least one frame of image to be displayed according to the adjusted gamma voltage curve.

In some embodiments, the timing controller further includes: a luminance conversion circuit and a data voltage output circuit. The luminance conversion circuit is configured to convert each of the data of gray scales of the at least one frame of image to be displayed into luminance data. The data voltage output circuit is coupled to the luminance conversion circuit and the gamma voltage calculation circuit. The data voltage output circuit is configured to output a data voltage corresponding to each of the data of gray scales of the at least one frame of image to be displayed according to the gamma voltage and the luminance data corresponding to each of the data of gray scales of the at least one frame of image to be displayed.

In yet another aspect, a display apparatus is provided. The display apparatus includes a display panel and the timing controller according to any one of the above embodiments. The timing controller is coupled to the display panel. The timing controller is configured to receive the data of gray scales of the at least one frame of image to be displayed by the display apparatus, and output a plurality of data voltages and a plurality of gamma voltages according to the data of gray scales of the at least one frame of image to be displayed.

In yet another aspect, a non-transitory computer-readable storage medium is provided. The non-transitory computer-readable storage medium has stored thereon computer program instructions that, when run on a processor, cause the processor to perform one or more steps in the method for improving image display quality according to any one of the above embodiments.

In yet another aspect, a computer program product is provided. The computer program product includes computer program instructions, which cause a computer to perform one or more steps in the method for improving image display quality described in any of the above embodiments when executed on the computer.

In yet another aspect, a computer program is provided. The computer program causes a computer to perform one or more steps in the method for improving image display quality described in any of the above embodiments when executed on the computer.

BRIEF DESCRIPTION OF THE DRAWINGS

In order to describe technical solutions in the present disclosure more clearly, the accompanying drawings to be used in some embodiments of the present disclosure will be introduced briefly below. However, the accompanying drawings to be described below are merely accompanying drawings of some embodiments of the present disclosure, and a person of ordinary skill in the art can obtain other drawings according to these drawings.

In addition, the accompanying drawings to be described below may be regarded as schematic diagrams, but are not limitations on an actual size of a product, and an actual process of a method involved in the embodiments of the present disclosure.

DETAILED DESCRIPTION

Figure 1:
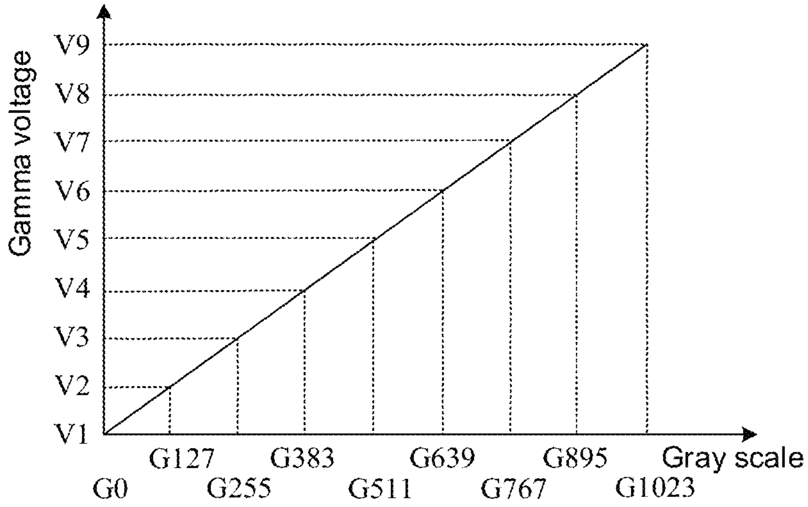
FIG. 1 is a schematic diagram of a gamma voltage curve in the related art.

Technical solutions in some embodiments of the present disclosure will be described clearly and completely below with reference to the accompanying drawings.

However, the described embodiments are merely some but not all embodiments of the present disclosure. All other embodiments obtained based on the embodiments of the present disclosure by a person of ordinary skill in the art shall be included in the protection scope of the present disclosure.

Unless the context requires otherwise, throughout the description and the claims, the term "comprise" and other forms thereof such as the third-person singular form "comprises" and the present participle form "comprising" are construed as an open and inclusive meaning, i.e., "including, but not limited to". In the description of the specification, the terms such as "one embodiment", "some embodiments", "exemplary embodiments", "example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials, or characteristics may be included in any one or more embodiments or examples in any suitable manner.

In the description of some embodiments, terms such as "coupled" and "connected" and derivatives thereof may be used. For example, the term "connected" may be used in the description of some embodiments to indicate that two or more components are in direct physical or electrical contact with each other. As another example, the term "coupled" may be used in the description of some embodiments to indicate that two or more components are in direct physical or electrical contact. However, the term "coupled" or "communicatively coupled" may also mean that two or more component are not in direct contact with each other, but still cooperate or interact with each other. The embodiments disclosed herein are not necessarily limited to the context herein.

The phrase "at least one of A, B and C" has a same meaning as the phrase "at least one of A, B or C", and they both include the following combinations of A, B and C: only A, only B, only C, a combination of A and B, a combination of A and C, a combination of B and C, and a combination of A, B and C.

The phrase "A and/or B" includes the following three combinations: only A, only B, and a combination of A and B.

As used herein, the term "if" is optionally construed as "when" or "in a case where" or "in response to determining that" or "in response to detecting", depending on the context. Similarly, the phrase "if it is determined that" or "if [a stated condition or event] is detected" is optionally construed as "in a case where it is determined that" or "in response to determining that" or "in a case where [the stated condition or event] is detected" or "in response to detecting [the stated condition or event]", depending on the context.

In addition, the use of the phrase "based on" is meant to be open and inclusive, since a process, step, calculation, or other action that is "based on" one or more of the stated conditions or values may, in practice, be based on additional conditions or values exceeding those stated.

The term "about" or "approximately" as used herein includes a stated value and an average value within an acceptable range of deviation of a particular value determined by a person of ordinary skill in the art, considering the measurement in questions and errors associated with the measurement of a particular quantity (i.e., limitations of the measurement system).

In the related art, an image distortion phenomenon may occur on a display apparatus. A reason for the image distortion phenomenon will be described below by taking an example in which the display apparatus is an OLED display apparatus.

Figure 2:
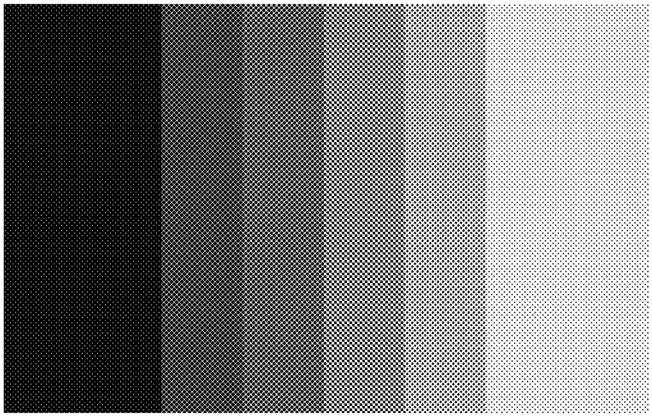
FIG. 2 is a schematic diagram of image distortion of an organic light-emitting diode (OLED) display apparatus in the related art.

The OLED display apparatus includes a display panel. The display panel generally includes transistors (such as thin film transistors or metal-oxide semiconductor field-effect transistors) and OLED light-emitting devices. Hereinafter, the description is made by taking an example in which the transistors are the thin film transistors. The thin film transistors and the OLED light-emitting devices age during operation, and aging of the thin film transistors and the OLED light-emitting devices consume a part of a total voltage. In a case where the total voltage of the OLED display apparatus is kept constant, since the thin film transistors and the OLED light-emitting devices consume the part of the total voltage, another part of the total voltage (i.e., a gamma voltage) for displaying an image is reduced. In addition, as shown in FIG. 1, a gamma voltage curve of the OLED display apparatus is a linear curve in the related art; and therefore, in a case where the gamma voltage is decreased, a phenomenon of gray scale loss easily occurs. The gray scale loss means that the number of data of gray scales that is finally displayed by the OLED display apparatus is less than the number of data of complete gray scales. For example, as shown in FIG. 2, based on the above reason, a 0 gray scale and a 1 gray scale share an output voltage (the output voltage being, for example, the gamma voltage). As a result, it is unable to distinguish between an image for displaying the 0 gray scale and an image for displaying the 1 gray scale, and thus the image distortion phenomenon occurs.

As shown in FIG. 1, in a coordinate system of the gamma voltage curve, a horizontal coordinate represents gray scales, and the gray scale is a gray scale corresponding to a data voltage that is actually input to realize an image display of the OLED display apparatus. A vertical coordinate represents gamma voltages each corresponding to a gray scale. The data voltage is converted by the gamma voltage.

It will be noted that, the gray scales are obtained by dividing a luminance change between brightest luminance and darkest luminance that can be displayed by the display panel of the OLED display apparatus into levels, so as to control luminance of the display panel. Each frame of display image displayed by the display panel is composed of colors displayed by multiple pixels. Generally, each pixel is capable of presenting different colors, and each color is composed of three primary colors of red, green and blue. Each pixel includes sub-pixels such as a red sub-pixel R, a green sub-pixel G and a blue sub-pixel B. Each sub-pixel is capable of presenting different luminance levels, and the gray scales represent levels of different luminance from the darkest luminance to the brightest luminance. The more levels of the different luminance from the darkest luminance to the brightest luminance are, the more delicate the presented image is.

Color depth, which may be referred to as color bit depth, is a unit that expresses the number of colors of a digital image in bits. For example, an 8 bit display panel is capable of representing 2 to the 8th power (which equals to 256) luminance levels. The 256 luminance levels may also be referred to as 256 gray scales. For another example, a 10 bit display panel is capable of representing 2 to the 10th power (which equals to 1024) luminance levels. The 1024 luminance levels may also be referred to as 1024 gray scales.

Figure 20:
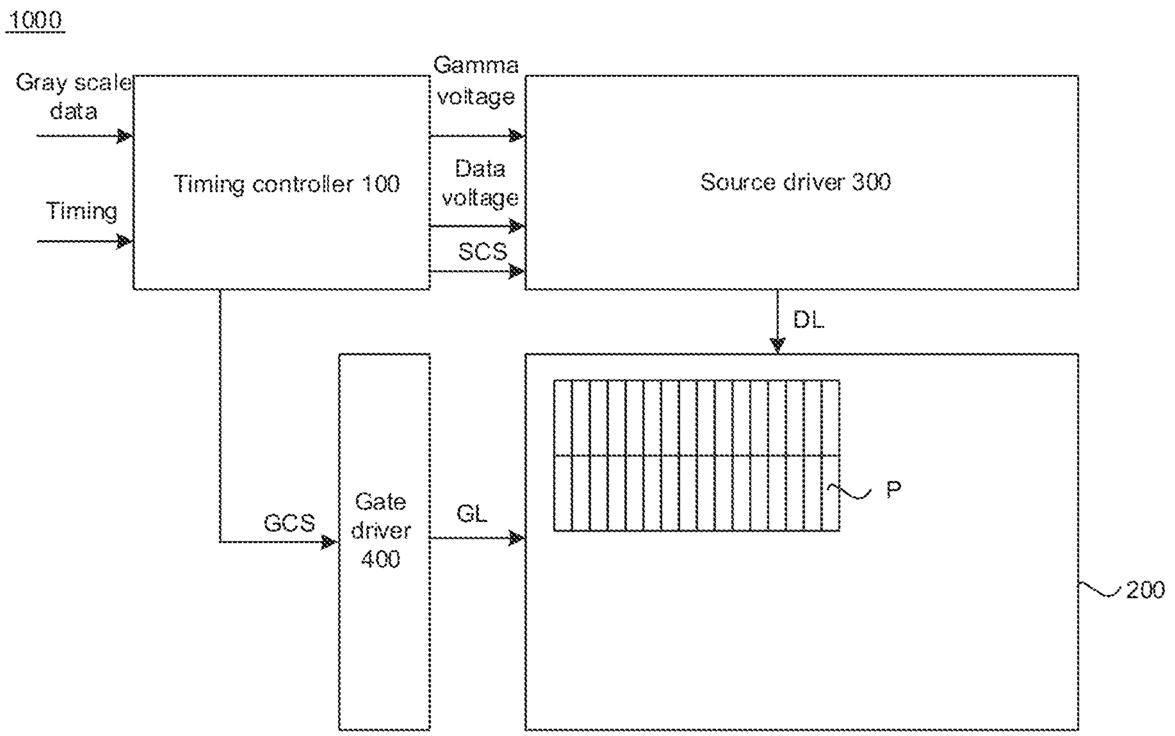
FIG. 20 is a structural diagram of a display apparatus, in accordance with some embodiments of the present disclosure.

Based on this, some embodiments of the present disclosure provides a display apparatus 1000, as shown in FIG. 20, the display apparatus 1000 includes a display panel 200 and a timing controller 100 coupled to the display panel 200. The timing controller 100 is configured to receive data of gray scales of at least one frame of image to be displayed by the display apparatus 1000 and output a plurality of data voltages and a plurality of gamma voltages according to the data of gray scales.

In some embodiments, as shown in FIG. 20, the display apparatus 1000 further includes a source driver 300 and a gate driver 400. A terminal of the source driver 300 is coupled to the timing controller 100, and another terminal of the source driver 300 is coupled to the display panel 200. A terminal of the gate driver 400 is coupled to the timing controller 100, and another terminal of the gate driver 400 is coupled to the display panel 200. In this case, the timing controller 100 is further configured to receive a timing control signal Timing, output a source control signal (abbreviated as: SCS) to the source driver 300, and output a gate control signal (abbreviated as: GCS) to the gate driver 400.

Figure 19:
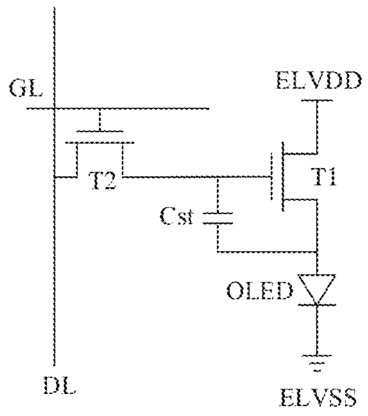
FIG. 19 is a structural diagram of a pixel drive circuit, in accordance with some embodiments of the present disclosure.

In some embodiments, the display panel 200 includes a plurality of pixels, and each pixel includes pixel drive circuits. For example, the display panel 200 is an OLED display panel, and the pixel drive circuit is a 2T1C pixel drive circuit. As shown in FIG. 19, the 2T1C pixel drive circuit includes a data line (abbreviated as: DL), a gate line (abbreviated as: GL), a storage capacitor Cst, a driving thin film transistor T1, a switching thin film transistor T2 and an OLED light-emitting device. An anode of the OLED light-emitting device is connected to a terminal ELVDD for outputting a driving voltage though the driving thin film transistor T1, and a cathode of the OLED light-emitting device is connected to another terminal ELVSS for outputting a low level power supply voltage.

Based on this, the source driver 300 is configured to receive the data voltages, the gamma voltages, and the source control signal that are output by the timing controller 100, generate source driving voltages Vdata, and transmit the source driving voltages Vdata to the display panel 200 through data lines. The gate driver 400 is configured to receive the gate control signal output by the timing controller 100, generate gate driving voltage(s) Vgata, and transmit the gate driving voltage(s) Vgata to the display panel 200 through at least one GL. The display panel 200 is capable of displaying an image under cooperation of the source driving voltages Vdata, the gate driving voltage(s) Vgata, the driving voltage and the low level power supply voltage.

Figure 3:
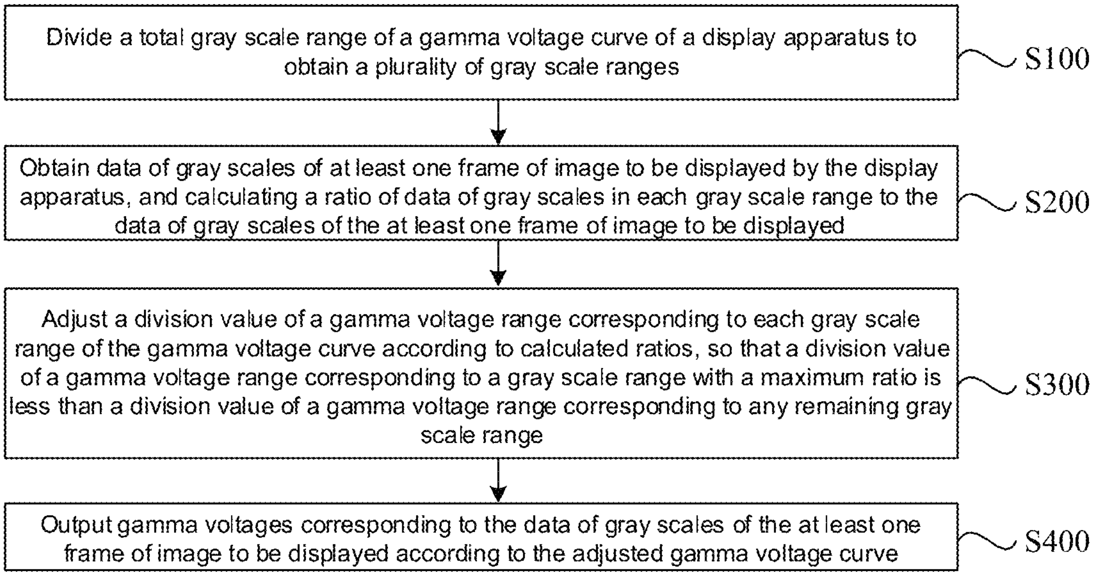
FIG. 3 is a flow diagram of a method for improving image display quality, in accordance with some embodiments of the present disclosure.

Some embodiments of the present disclosure also provide a method for improving image display quality. As shown in FIG. 3, the method for improving image display quality includes S100 to S400.

In S100, a total gray scale range of a gamma voltage curve of a display apparatus is divided to obtain a plurality of gray scale ranges.

In the embodiments of the present disclosure, in an example where the display panel included in the display apparatus is the 10 bit display panel, the total gray scale range of the gamma voltage curve of the display apparatus is 0 to 1024.

Figure 11:
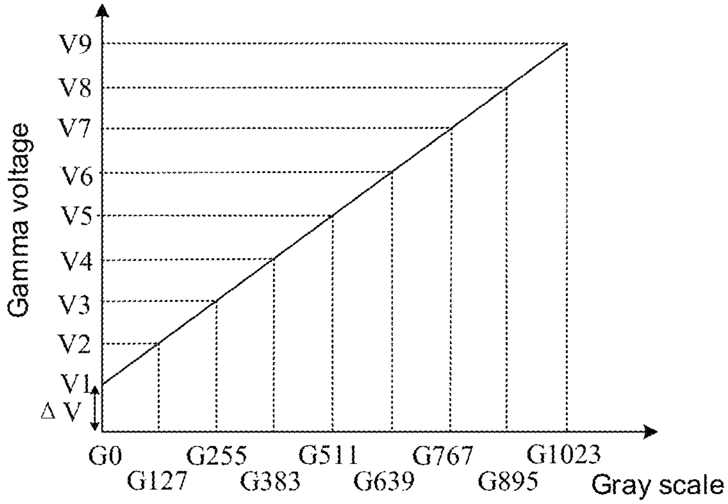
FIG. 11 is a schematic diagram of a gamma voltage curve, in accordance with some embodiments of the present disclosure.

For example, a horizontal coordinate of the gamma voltage curve as shown in FIG. 11 includes 1024 gray scale coordinates, grayscale values of the gray scale coordinates may be 0 gray scale (G0), 1 gray scale (G1), 2 gray scale (G2) . . . 1023 gray scale (G1023).

In some embodiments, the number of the gray scale ranges obtained by dividing the total gray scale range may be 2 to 5, and the number of the gray scale ranges may be selectively set according to actual needs.

In a process of dividing the 1024 gray scale coordinates in the total gray scale range into the gray scale ranges, for example, the 1024 gray scale coordinates in the total gray scale range may be divided into a low gray scale range, a medium gray scale range and a high gray scale range, and thus three gray scale ranges are obtained; as another example, the 1024 gray scale coordinates in the total gray scale range may be divided into a low gray scale range and a high gray scale range, and thus two gray scale ranges are obtained; as yet another example, the 1024 gray scale coordinates in the total gray scale range may be divided into a low gray scale range, a medium gray scale range, a secondary high gray scale range and a high gray scale range, and thus four gray scale ranges are obtained; as yet another example, the 1024 gray scale coordinates in the total gray scale range may be divided according to other division principles, so that five gray scale ranges are obtained. Here, the number of gray scale coordinates in each gray scale range may be selectively set according to actual needs.

In S200, data of gray scales of at least one frame of image to be displayed by the display apparatus is obtained, and a ratio of data of gray scales in each gray scale range to the data of gray scales of the at least one frame of image to be displayed is calculated.

In some examples, the at least one frame of image to be displayed by the display apparatus includes the data of gray scales, and the data of gray scales includes at least one of data of red gray scales for displaying a red color, data of green gray scales for displaying a green color, and data of blue gray scales for displaying a blue color. Here, the data of gray scales is a digital signal, and the data of gray scales includes a plurality of gray scale coordinates for displaying a certain color.

For example, the obtained data of gray scales of the at least one frame of image to be displayed by the display apparatus includes the data of red gray scales, the data of green gray scales, and the data of blue gray scales. The data of red gray scales, the data of green gray scales, and the data of blue gray scales each include multiple gray scale coordinates. For data of gray scales for displaying a same color, grayscale values of different gray scale coordinates are different.

After the data of gray scales is obtained, in data of gray scales for displaying each color (i.e., the data of red gray scales, data of green gray scales, or the data of blue gray scales), a ratio of data of gray scales in each gray scale range is calculated to determine data of gray scales that is mainly displayed in the at least one frame of image to be displayed.

For example, the 1024 gray scale coordinates in the total gray scale range are divided into three gray scale ranges. The three gray scale ranges are the low gray scale range (which is, for example, in a range of 0 gray scale to 255 gray scale), the medium gray scale range (which is, for example, in a range of 256 gray scale to 767 gray scale) and the high gray scale range (which is, for example, in a range of 768 gray scale to 1023 gray scale).

In an example where the data of red gray scales of the at least one frame of image to be displayed by the display apparatus is obtained, a ratio of gray scale coordinates of data of red gray scales in the low gray scale range, a ratio of gray scale coordinates of data of red gray scales in the medium gray scale range and a ratio of gray scale coordinates of data of red gray scales in the high gray scale range may be respectively calculated. In a case where the ratio of the gray scale coordinates of the data of red gray scales in the low gray scale range is maximum, it means that the at least one frame of image to be displayed is mainly displayed in the low gray scale range. In a case where the ratio of the gray scale coordinates of the data of red gray scales in the medium gray scale range is maximum, it means that the at least one frame of image to be displayed is mainly displayed in the medium gray scale range. In a case where the ratio of the gray scale coordinates of the data of red gray scales in the high gray scale range is maximum, it means that the at least one frame of image to be displayed is mainly displayed in the high gray scale range.

In S300, a division value of a gamma voltage range corresponding to each gray scale range of the gamma voltage curve is adjusted according to calculated ratios, so that a division value of a gamma voltage range corresponding to a gray scale range with a maximum ratio is less than a division value of a gamma voltage range corresponding to any remaining gray scale range.

Figure 12:
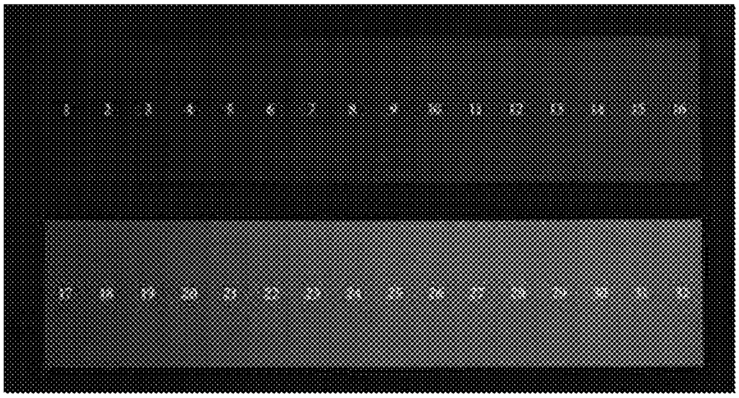
FIG. 12 is a schematic diagram of an image displayed by a display apparatus, in accordance with some embodiments of the present disclosure.
Figure 13:
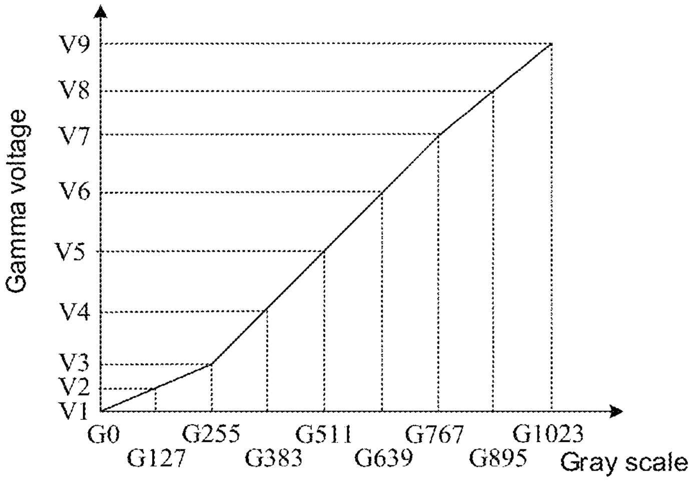
FIG. 13 is a schematic diagram of another gamma voltage curve, in accordance with some embodiments of the present disclosure.

In an example where the data of red gray scales of the at least one frame of image to be displayed by the display apparatus is obtained, and the total gray scale range of the gray scale coordinates of the data of red gray scales is divided into the low gray scale range, the medium gray scale range and the high gray scale range, in a case where the ratio of the gray scale coordinates of the data of red gray scales in the low gray scale range is maximum, the division value of the gamma voltage range corresponding to each gray scale range of the gamma voltage curve is adjusted, so that the division value of the gamma voltage range corresponding to the low gray scale range is less than division values of gamma voltage ranges corresponding to both the medium gray scale range and the high gray scale range (as shown in FIGS. 12 and 13).

In this way, the low gray scale range of the at least one frame of image to be displayed may have a more detailed voltage subdivision accuracy, which avoids the gray scale loss of the low gray scale range and the image distortion, and improves a capability for presenting a display image in the low gray scale range. As a result, image display quality of the display apparatus is improved.

In S400, gamma voltages corresponding to the data of gray scales of the at least one frame of image to be displayed are output according to the adjusted gamma voltage curve.

Figure 16:
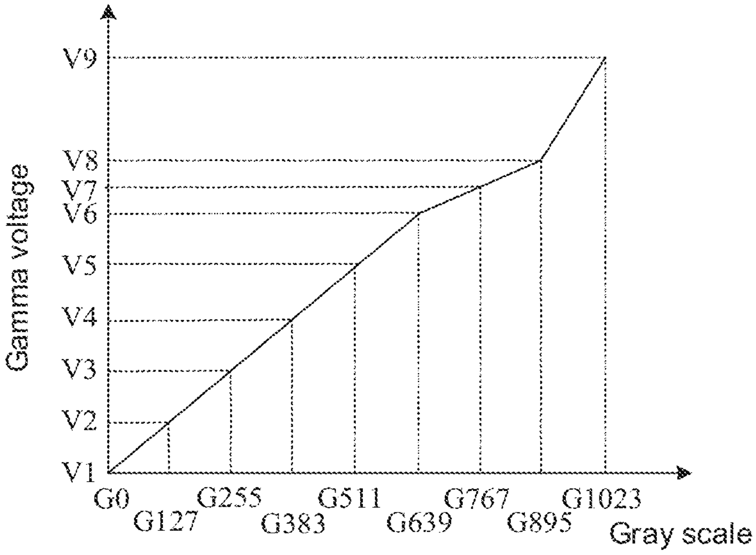
FIG. 16 is a schematic diagram of yet another gamma voltage curve, in accordance with some embodiments of the present disclosure.

In some embodiments, the adjusted gamma voltage curve is as shown in FIGS. 13 and 16. The division value of the gamma voltage range corresponding to the low gray scale range is less than division values of gamma voltage ranges corresponding to both the medium gray scale range and the high gray scale range in FIG. 13; while the division value of the gamma voltage range corresponding to the high gray scale range is less than division values of gamma voltage ranges corresponding to both the medium gray scale range and the low gray scale range in FIG. 16. In this case, the gamma voltages corresponding to the data of gray scales of the at least one frame of image to be displayed may be output according to the curve as shown in FIG. 13 or FIG. 16.

In some other examples, in a process of adjusting the division value of the gamma voltage range corresponding to each gray scale range of the gamma voltage curve, as shown in FIG. 11, a compensation voltage ΔV for the thin film transistors and the OLED light-emitting devices in pixel driving circuits of the display apparatus is further obtained.

For example, the compensation voltage ΔV for the thin film transistors and the OLED light-emitting devices in the pixel driving circuits of the display apparatus may be obtained as follows. After threshold voltages Vth of the thin film transistors are compensated every time, a minimum value Vth_min(N) of the threshold voltages Vth of all the thin film transistors in the display apparatus may be counted; and after efficiency η of the OLED light-emitting devices is compensated every time, a minimum value η_min(N) of the efficiency n of all the OLED light emitting-devices in the display apparatus may be counted. In this way, a compensation voltage change ΔV_(N), which is a quotient of the minimum value Vth_min(N) of the threshold voltages Vth of the thin film transistors and the minimum value η_min(N) of the efficiency n of the OLED light-emitting devices is obtained, i.e., ΔV (N)=Vth_min(N) η_min(N). In addition, a quotient of a minimum value Vth_min( ) of the threshold voltages Vth that is counted after initial compensation for the threshold voltages Vth of the thin film transistors and a minimum value η_min(1) of the efficiency n that is counted after initial compensation for the efficiency η of the OLED light-emitting devices, i.e., ΔV(1)=Vth_min(1)÷η_min(1). In this way, the compensation voltage ΔV for the thin film transistors and the OLED light-emitting devices in the display apparatus may be obtained, i.e., ΔV is equal to ΔV (N) minus ΔV_(1) (i.e., ΔV=ΔV_(N)−ΔV_(1)).

Figure 14:
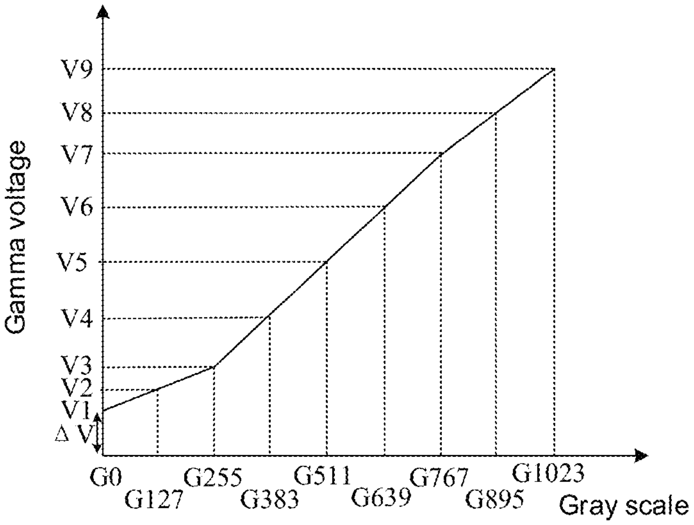
FIG. 14 is a schematic diagram of yet another gamma voltage curve, in accordance with some embodiments of the present disclosure.

Based on this, the adjusted gamma voltage curve may be also as shown in FIG. 14. That is, on a basis of adjusting the division value of the gamma voltage range corresponding to each gray scale range of the gamma voltage curve, the compensation voltage for the thin film transistors and the OLED light-emitting devices in the display apparatus is also adjusted, and through both of which, the gamma voltages corresponding to the data of gray scales of the at least one frame of image to be displayed are determined. In this case, the gamma voltages corresponding to the data of gray scales of the at least one frame of image to be displayed may also be output according to the curve as shown in FIG. 14.

Figure 4:
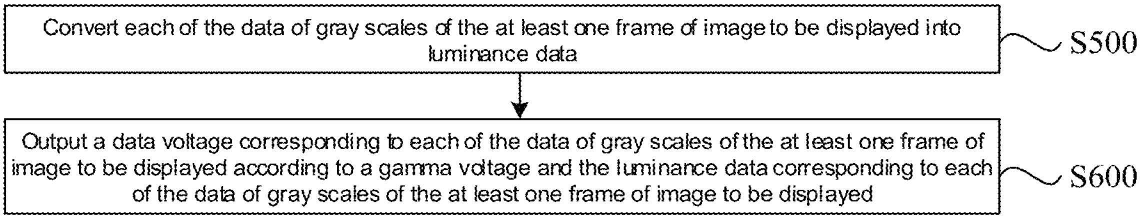
FIG. 4 is another flow diagram of a method for improving image display quality, in accordance with some embodiments of the present disclosure.

As shown in FIG. 4, the method for improving the image display quality in some embodiments of the present disclosure further includes S500 to S600.

In S500, each of the data of gray scales of the at least one frame of image to be displayed is converted into luminance data.

In S600, a data voltage corresponding to each of the data of gray scales of the at least one frame of image to be displayed is output according to the gamma voltage and the luminance data corresponding to each of the data of gray scales of the at least one frame of image to be displayed.

Figure 10:
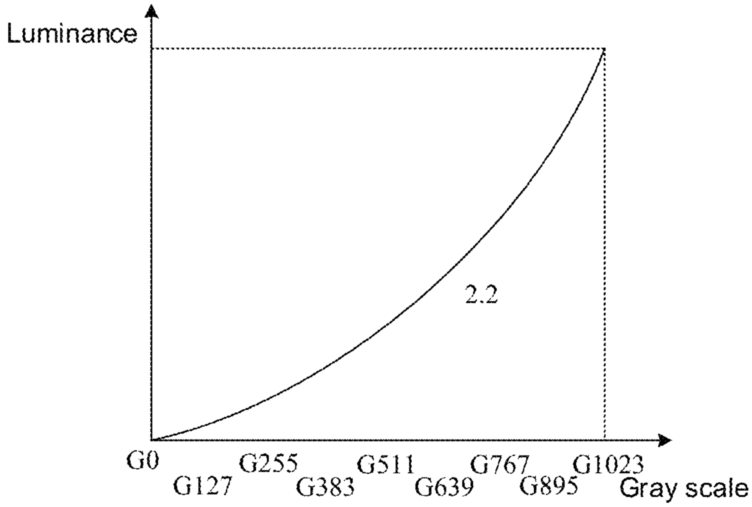
FIG. 10 is a schematic diagram of a gamma curve of 2.2, in accordance with some embodiments of the present disclosure.

In some examples, a conversion relationship between the gray scale and luminance conform to a gamma curve. For example, the gamma curve is a gamma curve of 2.2 (as shown in FIG. 10).

For example, the conversion relationship between the gray scale and the luminance conforms to following formulas. $L_R$ equals to $$\frac{G_R}{1024}\left(\text{i.e., } L_R = \frac{G_R}{1024}\right),$$

$L_G$ equals to $$\frac{G_G}{1024}\left(\text{i.e., } L_G = \frac{G_G}{1024}\right),$$

and $L_B$ equals to $$\frac{G_B}{1024}\left(\text{i.e., } L_B = \frac{G_B}{1024}\right).$$

$L_R$ represents luminance data corresponding to the data of red gray scale (i.e., the gray scale coordinate), and $G_R$ represents the data of red gray scale (i.e., the gray scale coordinate). $L_G$ represents luminance data corresponding to the data of green gray scale (i.e., the gray scale coordinate), and $G_G$ represents the data of green gray scale (i.e., the gray scale coordinate). $L_B$ represents luminance data corresponding to the data of blue gray scale (i.e., the gray scale coordinate), and $G_B$ represents the data of blue gray scale (i.e., the gray scale coordinate).

For example, a conversion relationship between the luminance data and the gamma voltage corresponding to each of the data of gray scales of the at least one frame of image to be displayed conforms to following formulas. $V_R$ equals to $(L_R)^{0.5}$(i.e., $V_R=(L_R)^{0.5}$), $V_G$ equals to $(L_G)^{0.5}$(i.e., $V_G=(L_G)^{0.5}$), and $V_B$ equals to $(L_B)^{0.5}$(i.e., $V_B=(L_B)^{0.5}$).

$V_R$ represents a gamma voltage corresponding to the luminance of the data of red gray scale (i.e., the gray scale coordinate); $V_G$ represents a gamma voltage corresponding to the luminance of the data of green gray scale (i.e., the gray scale coordinate); and $V_B$ represents a gamma voltage corresponding to the luminance of the data of blue gray scale (i.e., the gray scale coordinate).

Here, the data of red gray scale (i.e., the gray scale coordinate) is taken as an example, a conversion relationship between the data voltage and the gamma voltage corresponding the data of red gray scale conforms to following formulas.

In a case where $V_R$ is equal to or more than 0 V and equal to or less than 2.5 V (i.e., $0V \le V_R \le 2.5V$), the data voltage Data(R) equals to $$\frac{V_R}{0.0098}\left(\text{i.e., } \mathrm{Data}(R) = \frac{V_R}{0.0098}\right).$$

In a case where $V_R$ is equal to or more than 2.5 V and equal to or less than 7.5 V, the data voltage Data(R) equals to $$\frac{V_R}{0.0175}\left(\text{i.e., } \mathrm{Data}(R) = \frac{V_R}{0.0175}\right).$$

In a case where $V_R$ is equal to or more than 7.5 V and equal to or less than 10 V, the data voltage Data(R) equals to $$\frac{V_R}{0.0175}\left(\text{i.e., } \mathrm{Data}(R) = \frac{V_R}{0.0175}\right).$$

It will be noted that, series numbers of the steps (e.g., S100 to S600) are only for a purpose of describing content of each step more clearly, and do not limit an order of implementation of each step. For example, S100 and S500 may be performed simultaneously, instead of performing S100 to S400 sequentially before performing S500.

As another example, after S400 and S500 are performed, S600 is performed according to results of S400 and S500.

Figure 5:
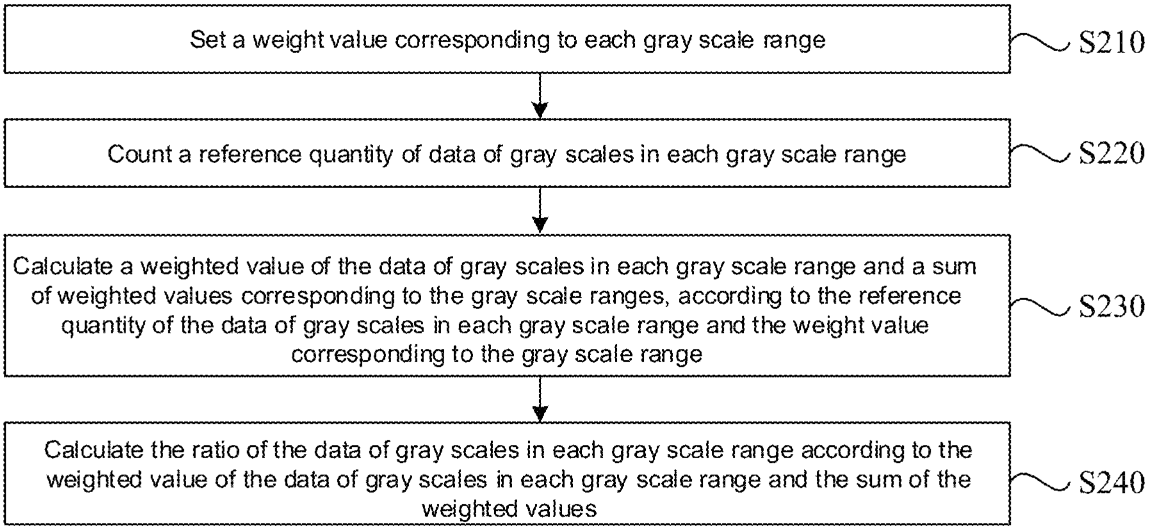
FIG. 5 is a flow diagram of S200 in the flow diagram shown in FIG. 3.

In some embodiments, as shown in FIG. 5, calculating the ratio of the data of gray scales in each gray scale range in S200 includes S210 to S240.

In S210, a weight value corresponding to each gray scale range is set.

It will be noted that, since the number of gray scale coordinates in each gray scale range may be different, or grayscale values of gray scale coordinates in each gray scale range may be different, it is necessary to set the weight value corresponding to each gray scale range according to the gray scale ranges actually divided.

In S220, a reference quantity of the data of gray scales in each gray scale range is counted.

The reference quantity may have different meanings in different examples, which may be selectively set according to actual needs.

In some examples, the reference quantity may be the number of the data of gray scales in each gray scale range.

For example, the 1024 gray scale coordinates in the total gray scale range are divided into three gray scale ranges. The three gray scale ranges are the low gray scale range (which includes, for example, 0 gray scale to 255 gray scale), the medium gray scale range (which includes, for example, 256 gray scale to 767 gray scale), and the high gray scale range (which includes, for example, 768 gray scale to 1023 gray scale). In the low gray scale range, the reference quantity is the number of data of gray scales (i.e., gray scale coordinates) in the low gray scale range, i.e., 256. In the medium gray scale range, the reference quantity is the number of data of gray scales (i.e., gray scale coordinates) in the medium gray scale range, i.e., 512. In the high gray scale range, the reference quantity is the number of data of gray scales (i.e., gray scale coordinates) in the high gray scale range, i.e., 256.

In some other examples, the reference quantity may be a sum of grayscale values of the data of gray scales in each gray scale range.

For example, in the case where the 1024 gray scale coordinates in the total gray scale range are still divided into the three gray scale ranges, in the low gray scale range, the reference quantity is a sum SUM_L of grayscale values of the data of gray scales (i.e., grayscale values of the gray scale coordinates) in the low gray scale range (i.e., SUM_L=0+1+2++255); in the medium gray scale range, the reference quantity is a sum SUM_M of grayscale values of the data of gray scales (i.e., grayscale values of the gray scale coordinates) in the medium gray scale range (i.e., SUM_M=256+257+258++767); and in the high gray scale range, the reference quantity is a sum SUM_H of grayscale values of the data of gray scales (i.e., grayscale values of the gray scale coordinates) in the high gray scale range (i.e., SUM_H=768+769+770+ . . . +1023).

In S230, a weighted value of the data of gray scales in each gray scale range is calculated and a sum of weighted values corresponding to the gray scale ranges is calculated, according to the reference quantity of the data of gray scales in each gray scale range and the weight value corresponding to the gray scale range.

Here, in the case where the reference quantity has different meanings, a manner of calculating the sum of the weighted values corresponding to the gray scale ranges may be different.

In some examples, in a case where the reference quantity is the number of the data of gray scales (i.e., gray scale coordinates) in each gray scale range, and the 1024 gray scale coordinates in the total gray scale range are divided into the three gray scale ranges, the reference quantity of the low gray scale range (which includes, for example, 0 gray scale to 255 gray scale) is 256, the reference quantity of the medium gray scale range (which includes, for example, 256 gray scale to 767 gray scale) is 512, and the reference quantity of the high gray scale range (which includes, for example, 768 gray scale to 1023 gray scale) is 256. In this case, a weight value of the low gray range may be set as a, a weight value of the medium gray range may be set as b, and a weight value of the high gray range may be set as c.

Based on this, a product of the number of the gray scale coordinates in each gray scale range and the weight value corresponding to the gray scale range may be equal or approximately equal. For example, the weight value a of the low gray range may be set to be equal to 1 (i.e., a=1), the weight value b of the medium gray range may be set to be equal to 0.5 (i.e., b=0.5), and the weight value c of the high gray range may be set to be equal to 1 (i.e., c=1).

In this case, the weighted value of the data of gray scales in each gray scale range is calculated. Thus, a weighted value of the data of gray scales in the low gray scale range is a×256, a weighted value of the data of gray scales in the medium gray scale range is b×512, and a weighted value of the data of gray scale in the high gray scale range is c×256.

A sum of weighted values corresponding to the three gray scale ranges is calculated, and the sum is (a×256+b×512+c×256).

In some other examples, in a case where the reference quantity is the sum of the grayscale values of the data of gray scales (i.e., the grayscale values of the gray scale coordinates) in each gray scale range, and the 1024 gray scale coordinates in the total gray scale range are divided into the three gray scale ranges, the reference quantity of the low gray scale range (which includes, for example, 0 gray scale to 255 gray scale) is SUM_L, the reference quantity of the medium gray scale range (which includes, for example, 256 gray scale to 767 gray scale) is SUM_M, and the reference quantity of the high gray scale range (which includes, for example, 768 gray scale to 1023 gray scale) is SUM_H. In this case, the weight value of the low gray range may be set as a', the weight value of the medium gray range may be set as b', and the weight value of the high gray range may be set as c'. In general, SUM_M is greater than SUM_L and less than SUM_H (i.e., SUM_L<SUM_M<SUM_H).

Based on this, the weight value corresponding to each gray scale range is inversely related to the sum of the grayscale values of the gray scale coordinates in the gray scale range. For example, it may be set that b' is greater than a' and less than c' (i.e., c'<b'<a').

In this case, the weighted value of the data of gray scales in each gray scale range is calculated. Thus, the weighted value of the data of gray scales in the low gray scale range is a'×SUM_L, the weighted value of the data of gray scales in the medium gray scale range is b'×SUM_M, and the weighted value of the data of gray scales in the high gray scale range is c'×SUM_H.

The sum of the weighted values corresponding to the three gray scale ranges is calculated, and the sum is (a'×SUM_L+b'×SUM_M+c'×SUM_H).

In S240, the ratio of the data of gray scales in each gray scale range is calculated according to the weighted value of the data of gray scales in each gray scale range and the sum of the weighted values.

For example, in the case where the reference quantity is the number of the data of gray scales in each gray scale range, and the1024 gray scale coordinates in the total gray scale range are divided into the three gray scale ranges, the ratio of the data of gray scales in the low gray scale range may be $R_L$, and $R_L$ equals to $$\frac{a \times 256}{a \times 256 + b \times 512 + c \times 256}$$

-continued $$\left(\text{i.e., } R_L = \frac{a\times 256}{a\times 256 + b\times 512 + c\times 256}\right);$$

the ratio of the data of gray scales in the medium gray scale range may be $R_M$, and $R_M$ equals to $$\frac{b\times 512}{a\times 256 + b\times 512 + c\times 256}$$

$$\left(\text{i.e., } R_M = \frac{b\times 512}{a\times 256 + b\times 512 + c\times 256}\right);$$

and the ratio of the data of gray scales in the high gray scale range may be $R_H$, and $R_H$ equals to $$\frac{c\times 256}{a\times 256 + b\times 512 + c\times 256}$$

$$\left(\text{i.e., } R_H = \frac{c\times 256}{a\times 256 + b\times 512 + c\times 256}\right);$$

For example, in the case where the reference quantity is the sum of the grayscale values of the data of gray scales in each gray scale range, and the 1024 gray scale coordinates in the total gray scale range are divided into the three gray scale ranges, the ratio of the data of gray scales in the low gray scale range may be $R_L'$, and $R_L'$ equals to $$\frac{a'\times \text{SUM\_L}}{a'\times \text{SUM\_L} + b'\times \text{SUM\_M} + c'\times \text{SUM\_H}}$$

$$\left(\text{i.e., } R_L' = \frac{a'\times \text{SUM\_L}}{a'\times \text{SUM\_L} + b'\times \text{SUM\_M} + c'\times \text{SUM\_H}}\right);$$

the ratio of the data of gray scales in the medium gray scale range may be $R_M'$, and $R_M'$ equals to $$\frac{b'\times \text{SUM\_M}}{a'\times \text{SUM\_L} + b'\times \text{SUM\_M} + c'\times \text{SUM\_H}}$$

$$\left(\text{i.e., } R_M' = \frac{b'\times \text{SUM\_M}}{a'\times \text{SUM\_L} + b'\times \text{SUM\_M} + c'\times \text{SUM\_H}}\right);$$

and the ratio of the data of gray scales in the high gray scale range may be $R_H'$, and $R_H'$ equals to $$\frac{c'\times SUM\_H}{a'\times SUM\_L + b'\times SUM\_M + c'\times SUM\_H}$$

$$\left(\text{i.e., } R_{H'} = \frac{c'\times SUM\_H}{a'\times SUM\_L + b'\times SUM\_M + c'\times SUM\_H}\right).$$

Figure 6:
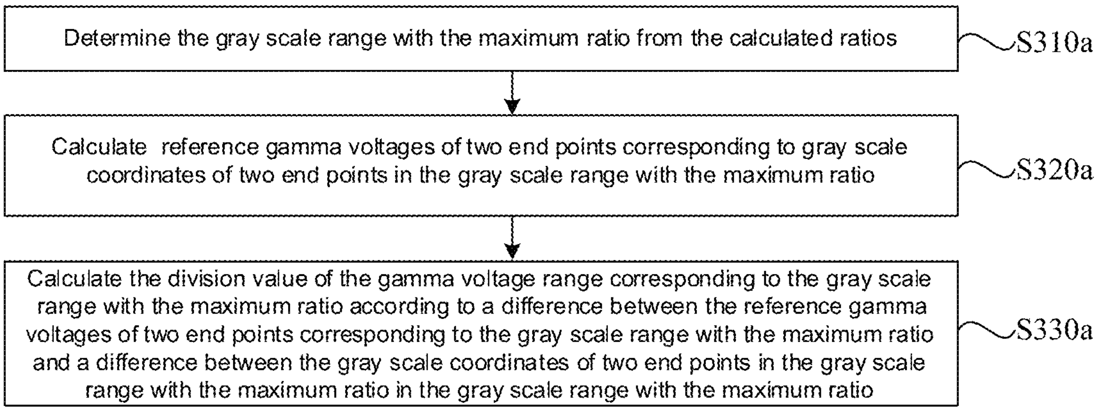
FIG. 6 is a flow diagram of S300 in the flow diagram shown in FIG. 3.

In some embodiments, as shown in FIG. 6, adjusting the division value of the gamma voltage range corresponding to each gray scale range of the gamma voltage curve according to the calculated ratios so that the division value of the gamma voltage range corresponding to the gray scale range with the maximum ratio is less than the division value of the gamma voltage range corresponding to any remaining gray scale range in S300 includes S310*a* to S330*a*.

In S310*a*, the gray scale range with the maximum ratio is determined from the calculated ratios.

After the ratio of the data of gray scales in each gray scale range is calculated in S240, the ratios are compared, so that the gray scale range with the maximum ratio may be determined.

In an example where the 1024 gray scale coordinates in the total gray scale range are divided into the low gray scale range (which includes, for example, 0 gray scale to 255 gray scale), the medium gray scale range (which includes, for example, 256 gray scale to 767 gray scale), and the high gray scale range (which includes, for example, 768 gray scale to 1023 gray scale), and the low gray scale range is determined to have the maximum ratio, it is assumed that V1 equals to 0 V (i.e., V1=0), V9 equals to 16 V (i.e., V9=16), and output luminance of the display apparatus ranges from 0 nit to 100 nit.

In S320*a*, reference gamma voltages of two end points corresponding to gray scale coordinates of two end points in the gray scale range with the maximum ratio are calculated.

For example, in the low gray range, in an ideal condition, output luminance corresponding to the gray scale coordinates of two end points in the gray scale range that is from 0 gray scale to 255 gray scale is firstly calculated, and then gamma voltages corresponding to the gray scale coordinates of two end points in the gray scale range that is from 0 gray scale to 255 gray scale are calculated.

Figure 7:
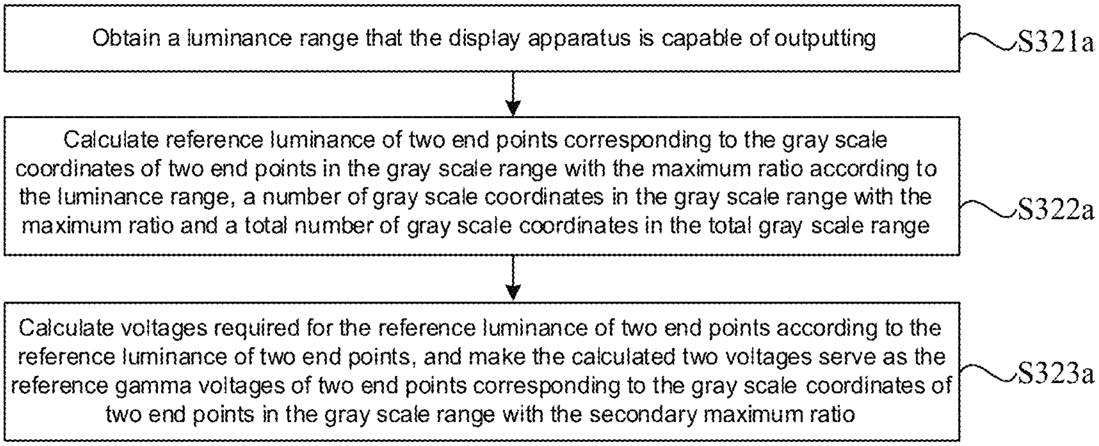
FIG. 7 is a flow diagram of S320*a* in the flow diagram shown in FIG. 6.

In some embodiments, as shown in FIG. 7, S320*a* includes S321*a* to S323*a*.

In S321*a*, a luminance range that the display apparatus is capable of outputting is obtained.

In S322*a*, reference luminance of two end points corresponding to the gray scale coordinates of two end points in the gray scale range with the maximum ratio are calculated according to the luminance range, the number of the gray scale coordinates in the gray scale range with the maximum ratio and the total number of gray scale coordinates in the total gray scale range.

In an example where the data of gray scales is the data of red gray scales and the gray scale range with the maximum ratio is the low gray scale range (which includes, for example, 0 gray scale to 255 gray scale), when the reference gamma voltages of two end points corresponding to the gray scale coordinates of two end points of data of red gray scales in the low gray scale range are calculated, luminance of two end points corresponding to the gray scale coordinates of two end points (i.e., 0 gray scale and 255 gray scale) may be obtained first, and thus the luminance range that the display apparatus is capable of outputting is obtained.

For example, the total number of gray scale coordinates in the total gray scale range is 1024, and the number of gray scale coordinates in the low gray scale range is 256. According to the gamma curve of 2.2 and the above conversion formula of the gray scale and the luminance $$\left(\text{e.g., } L_R = \frac{G_R}{1024}\right),$$

luminance of an end point corresponding to 0 gray scale is 0 nit, and luminance of another end point corresponding to 255 gray scale is 4.74 nit $$\left(\text{i.e., } 100\times\left(\frac{256}{1024}\right)^{2.2} = 4.74,\right.$$

where two decimal places are reserved for the result). Therefore, in the low gray scale range, the luminance range that the display apparatus is capable of outputting is between 0 nit and 4.74 nit.

In S323*a*, voltages required for the reference luminance of the two end points are calculated according to the reference luminance of the two end points, and the calculated two voltages are served as the reference gamma voltages of the two end points corresponding to the gray scale coordinates of two end points in the gray scale range with the maximum ratio.

For example, according to the above conversion formula of the luminance and the voltage (e.g., $V_R=(L_R)^{0.5}$), a reference gamma voltage of an end point corresponding to the 0 gray scale is 0 V, and a reference gamma voltage of another end point corresponding to the 255 gray scale is 2.17 V (i.e., $(4.74)^{0.5}=2.17$, where two decimal places are reserved for the result).

In S330*a*, the division value of the gamma voltage range corresponding to the gray scale range with the maximum ratio is calculated according to a difference between the reference gamma voltages of two end points corresponding to the gray scale range with the maximum ratio and a difference between the gray scale coordinates of two end points in the gray scale range with the maximum ratio.

In an example where the low gray scale range has the maximum ratio, the difference between the gray scale coordinates of two end points in the low gray scale range (i.e., 0 gray scale and 255 gray scale) is 255, and the difference between the reference gamma voltages of the two end points (i.e., 0 V and 2.17 V) is 2.17 V, it may thus be obtained that the division value of the gamma voltage range (i.e., a range of 0 V to 2.17 V) corresponding to the low gray scale range is 0.0085 V $$\text{(i.e., } \frac{2.17 -}{256} 0.0085,$$

where two significant figures are reserved for the result).

For example, in the related art, as shown in FIG. 1, the gamma voltage curve is the linear curve. In a case where the horizontal coordinate includes 1024 gray scales, the vertical coordinate includes gamma voltages V1, V2 . . . V8, and V9, and V1 equals to 0 V, V2 equals to 2 V, . . . , V9 equals to 16 V, a minimum gray scale output voltage (i.e., a division value of the vertical coordinate) is 0.0156 V $$\left(\text{i.e., } \frac{16}{1023} = 0.0156\right).$$

Thus, it can be seen that, the division values of the gamma voltages (i.e., the vertical coordinate) of the gamma voltage curve of the display apparatus in the related art are all 0.0156 V. In a case where the at least one frame of image to be displayed by the display apparatus in the related art is image(s) in which a certain gray scale range is mainly displayed, the display apparatus has a relatively low capability of subdividing voltages in the certain gray scale range that needs to be mainly displayed, so that image distortion is easy to occur, resulting in poor display effect.

However, in the embodiments of the present disclosure, it is possible to determine the gray scale range mainly displayed in the at least one frame of image to be displayed, and subdivide the gamma voltages corresponding to the gray scale range mainly displayed after the gray scale range is determined, i.e., reduce the division value of the gamma voltages corresponding to the gray scale range mainly displayed. For example, the division value of the gamma voltages corresponding to the gray scale range mainly displayed in some embodiments of the present disclosure described above is 0.0085 V, which is less than the division value (i.e., 0.0156 V) of the gamma voltages in the related art. In this way, the voltage subdivision capability of the gray scale range mainly displayed is effectively improved, and the image presentation capability of the gray scale range mainly displayed is improved, and thus the image distortion is avoided. As a result, the display quality of the image is improved.

For example, it can be seen from FIG. 12 that, the image is an image in a low gray scale state, and a ratio of the low gray scale range is the maximum. In this case, the gamma voltage curve (as shown in FIG. 13) may be adjusted, so that the division value of the gamma voltage range corresponding to the low gray scale range is relatively small, which may avoid the image distortion, thereby improving the image presentation capability of the low gray scale range.

Figure 15:
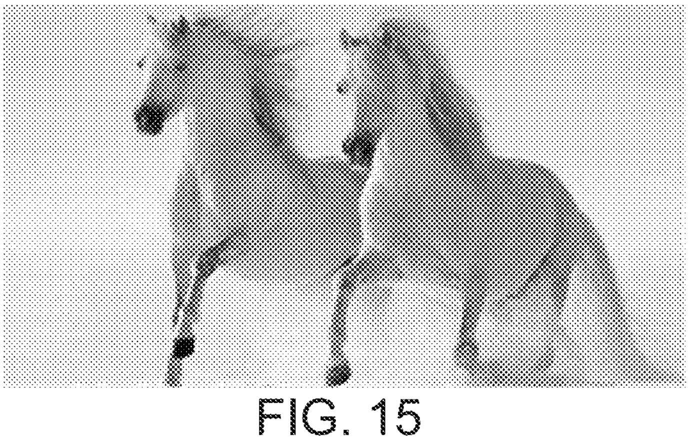
FIG. 15 is a schematic diagram of another image displayed by a display apparatus, in accordance with some embodiments of the present disclosure.

For example, it can be seen from FIG. 15 that, the image is an image in a high gray scale state, and a ratio of the high gray scale range is the maximum. In this case, the gamma voltage curve (as shown in FIG. 16) may be adjusted, so that the division value of the gamma voltage range corresponding to the high gray scale range is relatively small, which may avoid the image distortion, thereby improving the image presentation capability of the high gray scale range.

In some other embodiments, for the adjusted gamma voltage curve, a division value of a gamma voltage range corresponding to a gray scale range with a secondary maximum ratio is less than a division value of a gamma voltage range corresponding to each gray scale range except the gray scale range with the maximum ratio and the gray scale range with the secondary maximum ratio, and is greater than the division value of the gamma voltage range corresponding to the gray scale range with the maximum ratio.

Figure 8:
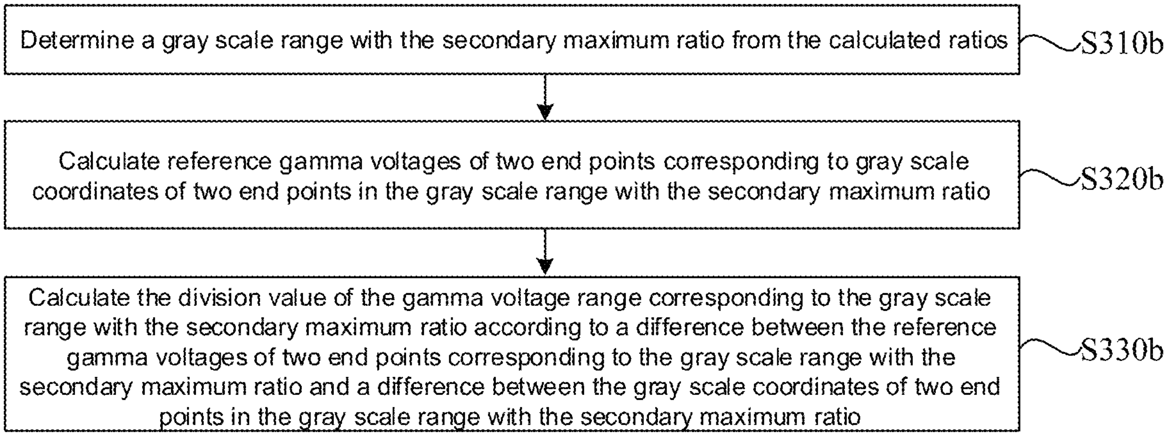
FIG. 8 is another flow diagram of S300 in the flow diagram shown in FIG. 3.

Based on this, as shown in FIG. 8, adjusting the division value of the gamma voltage range corresponding to each gray scale range of the gamma voltage curve according to the calculated ratios so that the division value of the gamma voltage range corresponding to the gray scale range with the maximum ratio is less than the division value of the gamma voltage range corresponding to any remaining gray scale range in S300, further includes S310*b* to S330*b*.

In S310*b*, a gray scale range with the secondary maximum ratio is determined from the calculated ratios.

After the ratio of the data of gray scales in each gray scale range is calculated in S240, the ratios are compared, so that the gray scale range with the secondary maximum ratio may be determined.

In an example where the gray scale coordinates in the total gray scale range are divided into three gray scale range (i.e., the low gray scale range, the medium gray scale range and the high gray scale range), and the low gray scale range has the maximum ratio, the gray scale range with the secondary maximum ratio is determined based on this. The gray scale range with the secondary maximum ratio may include one gray scale range (such as the medium gray scale range or the high gray scale range) or multiple gray scale ranges (such as the medium gray scale range and the high gray scale range), which is not limited in the embodiments of the present disclosure.

In S320*b*, reference gamma voltages of two end points corresponding to gray scale coordinates of two end points in the gray scale range with the secondary maximum ratio are calculated.

For example, the reference gamma voltages of two end points corresponding to the gray scale coordinates of two end points in the gray scale range with the secondary maximum ratio may be calculated according to the steps of the method described in S321*a* to S323*a*.

In an example where the data of gray scales is the data of red gray scales and the gray scale range with the secondary maximum ratio is the medium gray scale range (which includes, for example, 256 gray scale to 767 gray scale), when the reference gamma voltages of two end points corresponding to the gray scale coordinates of two end points of data of red gray scales in the medium gray scale range are calculated, luminance of two end points corresponding to the gray scale coordinates of two end points (i.e., 256 gray scale and 767 gray scale) may be obtained first, and thus the luminance range that the display apparatus is capable of outputting is obtained.

For example, the total number of the gray scale coordinates in the total gray scale range is 1024, and the number of gray scale coordinates in the medium gray scale range is 512. According to the gamma curve of 2.2 and the above conversion formula of the gray scale and the luminance $$\left(\text{e.g., } L_R = \frac{G_R}{1024}\right),$$

it may be obtained that luminance of an end point corresponding to the 256 gray scale is 4.78 nit, $$\left(\text{i.e., } 100\times\left(\frac{257}{1024}\right)^{2.2} = 4.78\right),$$

and luminance of another end point corresponding to the 767 gray scale is 53.10 nit $$\left(\text{i.e., } 100\times\left(\frac{768}{1024}\right)^{2.2} = 53.10,\right.$$

where two decimal places are reserved for the result). Therefore, in the medium gray scale range, the luminance range that the display apparatus is capable of outputting is 4.78 nit to 53.10 nit.

According to the above conversion formula of the luminance and the voltage (e.g., $V_R=(L_R)^{0.5}$), a reference gamma voltage of an end point corresponding to the 256 gray scale is 2.19 V (i.e., $(4.78)^{0.5}=2.19$), and a reference gamma voltage of another end point corresponding to the 767 gray scale is 7.29 V (i.e., $(53.10)^{0.5}=7.29$, where two decimal places are reserved for the result).

In S330*b*, the division value of the gamma voltage range corresponding to the gray scale range with the secondary maximum ratio is calculated according to a difference between the reference gamma voltages of two end points corresponding to the gray scale range with the secondary maximum ratio and a difference between the gray scale coordinates of two end points in the gray scale range with the secondary maximum ratio.

For example, the difference between the gray scale coordinates of two end points in the medium gray scale range (i.e., 256 gray scale and 767 gray scale) is 512, and the difference between the reference gamma voltages of two end points (i.e., 2.19 V and 7.29 V) is 5.1 V; and therefore, it may be obtained that the division value of the gamma voltage range (i.e., a range of 2.19 V to 7.29 V) corresponding to the medium gray scale range is $$0.010\text{ V (i.e., } \frac{5.1}{512} = 0.010,$$

where two significant figures are reserved for the result).

For example, in the above embodiments, a gray scale range except the gray scale range with the maximum ratio and the gray scale range with the secondary maximum ratio is the high gray range. The division value of the gamma voltage range corresponding to the high gray scale range (i.e., a range of 768 gray scale to 1023 gray scale) is calculated according to the steps of the method described in S321*a* to S323*a*. It may be obtained that luminance of an end point corresponding to the 768 gray scale is 53.26 nit, $$\left(\text{i.e., } 100\times\left(\frac{769}{1024}\right)^{2.2} = 53.26\right),$$

and luminance of another end point corresponding to the 1023 gray scale is 100 nit $$\left(\text{i.e., } 100\times\left(\frac{1024}{1024}\right)^{2.2} = 100,\right.$$

where two decimal places are reserved for the result). Therefore, in the high gray scale range, the luminance range that the display apparatus is capable of outputting is 53.26 nit to 100 nit.

According to the above conversion formula of the luminance and the voltage (e.g., $V_R=(L_R)^{0.5}$), a reference gamma voltage of an end point corresponding to the 768 gray scale is 7.30 V (i.e., (53.26)=7.30), where two decimal places are reserved for the result), and a reference gamma voltage of another end point corresponding to the 1023 gray scale is 10 V (i.e., $(100)^{0.5}=10$).

The difference between the gray scale coordinates of two end points in the high gray scale range (i.e., the 768 gray scale and the 1023 gray scale) is 256, and the difference between the reference gamma voltages of two end points (i.e., 7.30 V and 10 V) is 2.7 V; and therefore, it may be obtained that the division value of the gamma voltage range (i.e., a range of 7.30 V to 10 V) corresponding to the high gray scale range is 0.011 V $$\text{(i.e., } \frac{2.7}{256} = 0.011,$$

where two significant figures are reserved for the result).

Thus, it can be seen that, for the adjusted gamma voltage curve, the division value of the gamma voltage range corresponding to the medium gray scale range with the secondary maximum ratio is less than the division value of the gamma voltage range corresponding to the high gray scale range, and is greater than the division value of the gamma voltage range corresponding to the low gray scale range.

In this way, the division value of the gamma voltage range corresponding to each gray scale range may be better adjusted according to whether the gray scale range is mainly displayed in the display image, so that the voltage subdivision capability of the gray scale range mainly display is improved, and the display quality of the display image is improved.

Figure 9:
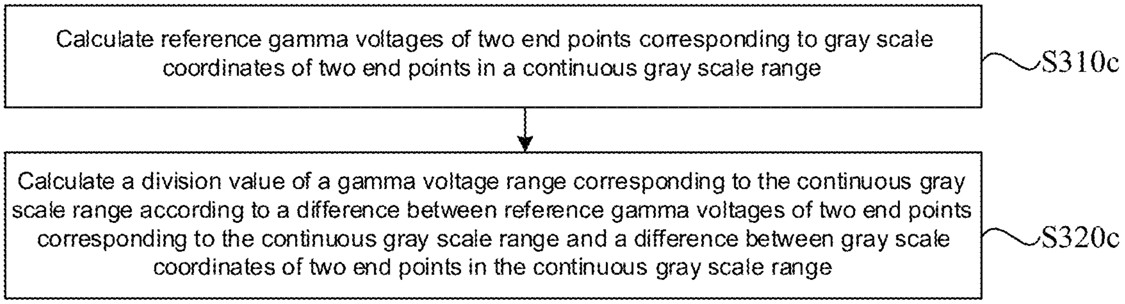
FIG. 9 is yet another flow diagram of S300 in the flow diagram shown in FIG. 3.

In some other embodiments, as shown in FIG. 9, adjusting the division value of the gamma voltage range corresponding to each gray scale range of the gamma voltage curve according to the calculated ratios so that the division value of the gamma voltage range corresponding to the gray scale range with the maximum ratio is less than the division value of the gamma voltage range corresponding to any remaining gray scale range in S300, further includes S310*c* to S320*c*.

In S310*c*, reference gamma voltages of two end points corresponding to gray scale coordinates of two end points in a continuous gray scale range are calculated.

In some examples, in a case where only the division value of the gamma voltage range corresponding to the gray scale range with the maximum ratio is calculated, the continuous gray scale range is a continuous gray scale range composed of gray scale ranges except the gray scale range with the maximum ratio in the plurality of gray scale ranges.

In an example where the total gray scale range is divided into the low gray scale range, the medium gray scale range and the high gray scale range, in a case where the gray scale range with the maximum ratio is the low gray scale range, the continuous gray scale range may be composed of the medium gray scale range and the high gray scale range.

In some other examples, in a case where the division value of the gamma voltage range corresponding to the gray scale range with the maximum ratio and the division value of the gamma voltage range corresponding to the gray scale range with the secondary maximum ratio are calculated, the continuous gray scale range is a continuous gray scale range composed of gray scale ranges except the gray scale range with the maximum ratio and the gray scale range with the secondary maximum ratio in the plurality of gray scale ranges.

In an example where the total gray scale range is divided into four gray scale ranges (i.e., the low gray scale range, the medium gray scale range, the secondary high gray scale range and the high gray scale range), in a case where the gray scale range with the maximum ratio is the low gray scale range, and the gray scale range with the secondary maximum ratio is the medium gray scale range, the continuous gray scale range may be composed of the secondary high gray scale range and the high gray scale range.

In S320*c*, a division value of a gamma voltage range corresponding to the continuous gray scale range is calculated according to a difference between the reference gamma voltages of two end points corresponding to the continuous gray scale range and a difference between the gray scale coordinates of two end points in the continuous gray scale range.

For example, the division value of the gamma voltage range corresponding to the continuous gray scale range may be calculated according to the steps of the method described in S321*a* to S323*a*, which will not be repeated here.

In some embodiments, the display apparatus 1000 provided in the embodiments of the present disclosure may be an active light-emitting display apparatus, such as the OLED display apparatus; or, the display apparatus 1000 may also be a passive light-emitting display apparatus, such as a liquid crystal display (LCD) apparatus, which is not limited in the embodiments of the present disclosure.

For example, in the case where the display apparatus 1000 is the active light-emitting display apparatus (e.g., the OLED display apparatus), a total gamma voltage range composed of the gamma voltage ranges corresponding to the plurality of gray scale ranges may be a range that is obtained by subtracting the compensation voltage range from an ideal data voltage range that the display apparatus is capable of providing. The compensation voltage range is a compensation voltage range required for compensating transistors and/or active light-emitting devices (e.g., OLED light-emitting devices) of the display apparatus.

Figure 17:
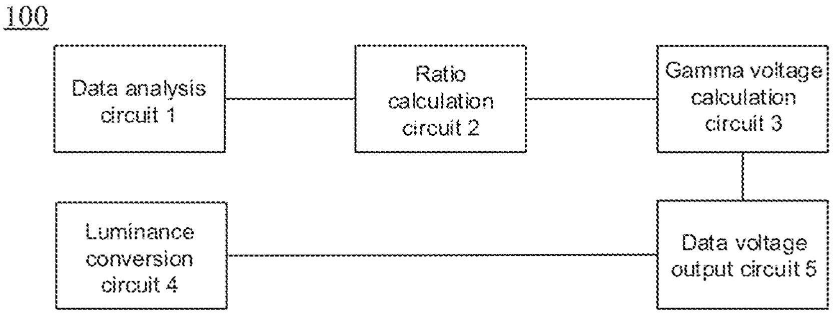
FIG. 17 is a structural diagram of a timing controller, in accordance with some embodiments of the present disclosure.

Some embodiments of the present disclosure also provide a timing controller 100. As shown in FIG. 17, the timing controller 100 includes a data analysis circuit 1, a ratio calculation circuit 2 and a gamma voltage calculation circuit 3.

In some examples, the data analysis circuit 1 is configured to divide a total gray scale range of a gamma voltage curve of the display apparatus 1000 to obtain a plurality of gray scale ranges, and obtain data of gray scales of at least one frame of image to be displayed by the display apparatus 1000. A process of dividing the total gray scale range of the gamma voltage curve to obtain the plurality of gray scale ranges, and a process of obtaining the data of gray scales of the at least one frame of image to be displayed by the display apparatus 1000 may be referred to relevant exemplary descriptions in the above embodiments, which will not be repeated here.

In some examples, the ratio calculation circuit 2 is coupled to the data analysis circuit 1. The ratio calculation circuit 2 is configured to calculate a ratio of data of gray scales in each gray scale range. A process of calculating the ratio of the data of gray scales in each gray scale range may be referred to relevant exemplary descriptions in the above embodiments, which will not be repeated here.

In some examples, the gamma voltage calculation circuit 3 is coupled to the ratio calculation circuit 2. The gamma voltage calculation circuit 3 is configured to: adjust a division value of a gamma voltage range corresponding to each gray scale range of the gamma voltage curve according to calculated ratios, so that a division value of a gamma voltage range corresponding to a gray scale range with a maximum ratio is less than a division value of a gamma voltage range corresponding to any remaining gray scale range; and output gamma voltages corresponding to the data of gray scales of the at least one frame of image to be displayed according to the adjusted gamma voltage curve. A working process of the gamma voltage calculation circuit 3 may be referred to relevant exemplary descriptions in the above embodiments, which will not be repeated here.

Beneficial effects that may be achieved by the timing controller 100 provided in the embodiments of the present disclosure are the same as the beneficial effects that may be achieved by the method for improving image display quality provided in the above embodiments, which will not be repeated here.

In some embodiments, as shown in FIG. 17, the timing controller 100 further includes a luminance conversion circuit 4 and a data voltage output circuit 5. The luminance conversion circuit 4 is configured to convert each of the data of gray scales of the at least one frame of image to be displayed into luminance data. The data voltage output circuit 5 is coupled to the luminance conversion circuit 4 and the gamma voltage calculation circuit 3. The data voltage output circuit 5 is configured to output a data voltage corresponding to each of the data of gray scales of the at least one frame of image to be displayed according to the gamma voltage and the luminance data corresponding to each of the data of gray scales of the at least one frame of image to be displayed.

Figure 18:
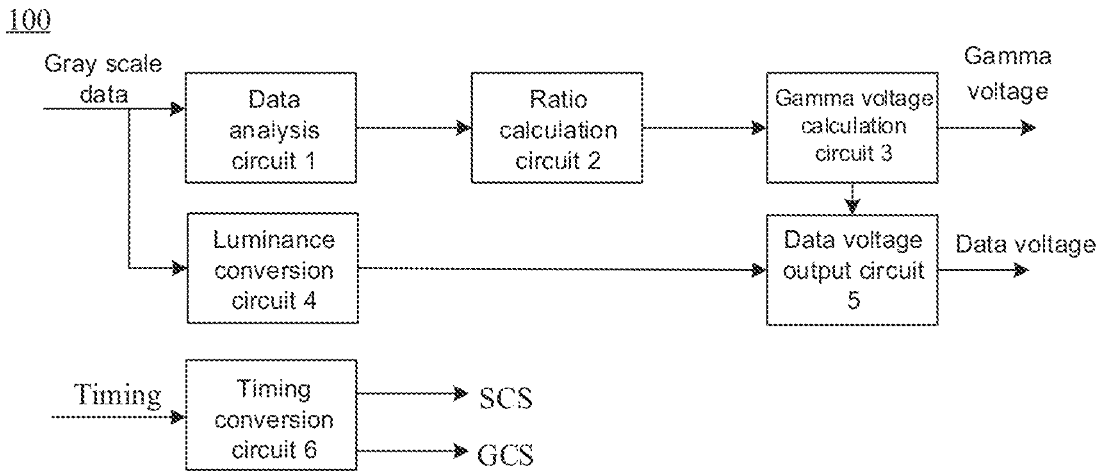
FIG. 18 is a structural diagram of another timing controller, in accordance with some embodiments of the present disclosure.

In some embodiments, as shown in FIG. 18, the timing controller 100 further includes a timing conversion circuit 6 configured to convert a timing control signal Timing into a source control signal SCS and a gate control signal GCS.

Display luminance of the display apparatus in some embodiments of the present disclosure is compared with the related art, which is schematically described below.

As shown in Table 1, Table 1 is a comparison table of display luminance of the display apparatus in the related art and the display luminance of the display apparatus in some embodiments of the present disclosure.

TABLE 1

| | | The related art | | | Some embodiments of the present disclosure | | |
|---|---|---|---|---|---|---|---|
| Gray scale | Luminance 1 (nit) | | Voltage (v) | Luminance 2 (nit) | | Voltage (v) | Luminance 2 (nit) |
| 1 | 0.01 | 1 | 0.01 | 0.01 | 1 | 0.01 | 0.01 |
| 2 | 0.04 | 1 | 0.01 | 0.01 | 2 | 0.02 | 0.04 |
| 3 | 0.09 | 2 | 0.04 | 0.04 | 3 | 0.03 | 0.09 |
| 4 | 0.16 | 4 | 0.16 | 0.16 | 4 | 0.04 | 0.16 |

In Table 1, the gray scale is the data of gray scale; luminance 1 is luminance data converted from the data of gray scale, which may conform to the gamma curve of 2.2; the voltage is a source driving voltage output by the source driver 300 according to a data voltage output by the timing controller 100, the data voltage being output by the timing controller 100 to the source driver 300, and the source driving voltage being output by the source driver 300 to the display panel 200 through the DL; and luminance 2 is actual luminance data output by the OLED light-emitting device (i.e., luminance data output by the display apparatus) after a current generated by the pixel driving circuit of the display apparatus is output to the OLED light-emitting device.

It will be noted that, as shown in FIG. 1, in the related art, the entire gamma voltage curve is the linear curve. In an example where the total gray scale range of the gamma voltage curve is 0 to 1023, (for example, V1 equals to 0 V, V2 equals to 2 V, . . . , V9 equals to 16 V), a minimum output voltage is 0.0156 V $$\left(\text{i.e., } \frac{16}{1023} = 0.0156\right).$$

As shown in FIG. 13, the entire gamma voltage curve in the embodiments of the present disclosure is not a linear curve. In an example where the total gray scale range of the gamma voltage curve is 0 to 1023, and the 1024 gray scale coordinates in the total gray scale range are divided into the low gray scale range (which includes, for example, 0 gray scale to 255 gray scale), the medium gray scale range (which includes, for example, 256 gray scale to 767 gray scale) and the high gray scale range (which includes, for example, 768 gray scale to 1023 gray scale), output luminance of the display apparatus may range from 0 nit to 400 nit, and luminance of an end point corresponding to the 255 gray scale is 18.95 nit $$\left(\text{i.e., } 400 \times \left(\frac{256}{1024}\right)^{2.2} = 18.95\right).$$

In this case, a reference gamma voltage of an end point corresponding to the 255 gray scale is 2.5V (i.e., $(6.25)^{0.5}=2.5$), and a division value of a corresponding gamma voltage range (i.e., a range of 0 V to 2.5 V) is 0.00976 V $$\left(\text{i.e., } \frac{2.5}{256} = 0.00976\right).$$

It can be seen from Table 1, the luminance data output by the display apparatus in the embodiments of the present disclosure is substantially the same as the luminance data converted from the data of gray scale. In this way, in the embodiments of the present disclosure, by subdividing division values of gamma voltage ranges corresponding to different gray scale ranges of the at least one frame of image to be displayed by the display apparatus, the gamma voltages and the data voltages corresponding to the output data of gray scales are controlled, and thus it may be possible to avoid the gray scale loss of different gray scale ranges and the image distortion, and improve the capability for presenting the display image in different gray scale ranges. As a result, the image display quality of the display apparatus is improved.

Some embodiments of the present disclosure provide a computer-readable storage medium. The computer-readable storage medium has stored thereon computer program instructions that, when run on a processor, cause the processor to perform one or more steps in the method for improving image display quality as described in any one of the above embodiments. The computer-readable storage medium may be, for example, a non-transitory computer-readable storage medium.

Some embodiments of the present disclosure provide a computer program product. The computer program product includes computer program instructions, which cause a computer to perform one or more steps in the method for improving image display quality as described in any one of the above embodiments when executed on the computer.

Some embodiments of the present disclosure provide a computer program. The computer program causes a computer to perform one or more steps in the method for improving image display quality as described in any one of the above embodiments when executed on the computer.

The computer-readable storage medium, the computer program product and the computer program have the same beneficial effects as the method for improving image display quality as described in the embodiments of the present disclosure, which will be not repeated here.

The foregoing descriptions are merely specific implementations of the present disclosure, but the protection scope of the present disclosure is not limited thereto. Any changes or replacements that a person skilled in the art could conceive of within the technical scope of the present disclosure shall be included in the protection scope of the present disclosure. Therefore, the protection scope of the present disclosure shall be subject to the protection scope of the claims.

What is claimed is:

1. A method for improving image display quality, comprising:

dividing a total gray scale range of a gamma voltage curve of a display apparatus to obtain a plurality of gray scale ranges;

obtaining data of gray scales of at least one frame of image to be displayed by the display apparatus, and calculating a ratio of data of gray scales in each gray scale range to the data of gray scales of the at least one frame of image to be displayed;

adjusting a division value of a gamma voltage range corresponding to each gray scale range of the gamma voltage curve according to the calculated ratio, so that a division value of a gamma voltage range corresponding to a gray scale range with a maximum ratio is less than a division value of a gamma voltage range corresponding to any remaining gray scale range; and outputting gamma voltages corresponding to the data of gray scales of the at least one frame of image to be displayed according to the adjusted gamma voltage curve;

wherein adjusting the division value of the gamma voltage range corresponding to each gray scale range of the gamma voltage curve according to the calculated ratio so that the division value of the gamma voltage range corresponding to the gray scale range with the maximum ratio is less than the division value of the gamma voltage range corresponding to any remaining gray scale range, includes:

determining the gray scale range with the maximum ratio from the calculated ratios;

calculating reference gamma voltages of two end points corresponding to gray scale coordinates of two end points in the gray scale range with the maximum ratio; and calculating the division value of the gamma voltage range corresponding to the gray scale range with the maximum ratio according to a difference between the reference gamma voltages of two end points corresponding to the gray scale range with the maximum ratio and a difference between the gray scale coordinates of two end points in the gray scale range with the maximum ratio.

2. The method according to claim 1, wherein calculating the ratio of the data of gray scales in each gray scale range to the data of gray scales of the at least one frame of image to be displayed includes:

setting a weight value corresponding to each gray scale range;

counting a reference quantity of the data of gray scales in each gray scale range;

calculating a weighted value of the data of gray scales in each gray scale range and a sum of weighted values corresponding to the gray scale ranges, according to the reference quantity of the data of gray scales in each gray scale range and the weight value corresponding to the gray scale range; and calculating the ratio of the data of gray scales in each gray scale range according to the weighted value of the data of gray scales in each gray scale range and the sum of the weighted values.

3. The method according to claim 2, wherein the reference quantity is a number of the data of gray scales in each gray scale range.

4. The method according to claim 3, wherein a product of the number of the data of gray scales in each gray scale range and the weight value corresponding to the gray scale range is approximately equal.

5. The method according to claim 2, wherein the reference quantity is a sum of grayscale values of the data of gray scales in each gray scale range.

6. The method according to claim 5, wherein the weight value corresponding to each gray scale range is inversely related to the sum of the grayscale values of the data of gray scales in the gray scale range.

7. The method according to claim 1, wherein calculating the reference gamma voltages of two end points corresponding to the gray scale coordinates of two end points in the gray scale range with the maximum ratio, includes:

obtaining a luminance range that the display apparatus is capable of outputting;

calculating reference luminance of two end points corresponding to the gray scale coordinates of two end points in the gray scale range with the maximum ratio according to the luminance range, a number of gray scale coordinates in the gray scale range with the maximum ratio and a total number of gray scale coordinates in the total gray scale range; and calculating voltages required for the reference luminance of two end points according to the reference luminance of two end points, and making the calculated two voltages serve as the reference gamma voltages of two end points corresponding to the gray scale coordinates of two end points in the gray scale range with the maximum ratio.

8. The method according to claim 1, wherein for the adjusted gamma voltage curve, a division value of a gamma voltage range corresponding to a gray scale range with a secondary maximum ratio is less than a division value of a gamma voltage range corresponding to each gray scale range except the gray scale range with the maximum ratio and the gray scale range with the secondary maximum ratio, and is greater than the division value of the gamma voltage range corresponding to the gray scale range with the maximum ratio; and adjusting the division value of the gamma voltage range corresponding to each gray scale range of the gamma voltage curve according to the calculated ratio so that the division value of the gamma voltage range corresponding to the gray scale range with the maximum ratio is less than the division value of the gamma voltage range corresponding to any remaining gray scale range, further includes:

determining the gray scale range with the secondary maximum ratio from the calculated ratios;

calculating reference gamma voltages of two end points corresponding to gray scale coordinates of two end points in the gray scale range with the secondary maximum ratio; and calculating the division value of the gamma voltage range corresponding to the gray scale range with the secondary maximum ratio according to a difference between the reference gamma voltages of two end points corresponding to the gray scale range with the secondary maximum ratio and a difference between the gray scale coordinates of two end points in the gray scale range with the secondary maximum ratio.

9. The method according to claim 8, wherein adjusting the division value of the gamma voltage range corresponding to each gray scale range of the gamma voltage curve according to the calculated ratio so that the division value of the gamma voltage range corresponding to the gray scale range with the maximum ratio is less than the division value of the gamma voltage range corresponding to any remaining gray scale range, further includes:

calculating reference gamma voltages of two end points corresponding to gray scale coordinates of two end points in a continuous gray scale range; and calculating a division value of a gamma voltage range corresponding to the continuous gray scale range according to a difference between the reference gamma voltages of two end points corresponding to the continuous gray scale range and a difference between the gray scale coordinates of two end points in the continuous gray scale range, wherein the division value of the gamma voltage range corresponding to the gray scale range with the maximum ratio and the division value of the gamma voltage range corresponding to the gray scale range with the secondary maximum ratio are calculated, the continuous gray scale range is a continuous gray scale range composed of gray scale ranges except the gray scale range with the maximum ratio and the gray scale range with the secondary maximum ratio in the plurality of gray scale ranges.

10. The method according to claim 1, wherein adjusting the division value of the gamma voltage range corresponding to each gray scale range of the gamma voltage curve according to the calculated ratio so that the division value of the gamma voltage range corresponding to the gray scale range with the maximum ratio is less than the division value of the gamma voltage range corresponding to any remaining gray scale range, further includes:

calculating reference gamma voltages of two end points corresponding to gray scale coordinates of two end points in a continuous gray scale range; and calculating a division value of a gamma voltage range corresponding to the continuous gray scale range according to a difference between the reference gamma voltages of two end points corresponding to the continuous gray scale range and a difference between the gray scale coordinates of two end points in the continuous gray scale range, wherein only the division value of the gamma voltage range corresponding to the gray scale range with the maximum ratio is calculated, the continuous gray scale range is a continuous gray scale range composed of gray scale ranges except the gray scale range with the maximum ratio in the plurality of gray scale ranges.

11. The method according to claim 1, wherein a number of the gray scale ranges obtained by dividing the total gray scale range is two to five.

12. The method according to according to claim 11, wherein the number of the gray scale ranges obtained by dividing the total gray scale range is three, and the three gray scale ranges are a low gray scale range, a medium gray scale range and a high gray scale range.

13. The method according to claim 1, further comprising:

converting each of the data of gray scales of the at least one frame of image to be displayed into luminance data; and outputting a data voltage corresponding to each of the data of gray scales of the at least one frame of image to be displayed according to a gamma voltage and the luminance data corresponding to each of the data of gray scales of the at least one frame of image to be displayed.

14. The method according to claim 1, wherein the display apparatus is an active light-emitting display apparatus; and a total gamma voltage range composed of gamma voltage ranges corresponding to the plurality of gray scale ranges is a range that is obtained by subtracting the compensation voltage range from an ideal data voltage range that the display apparatus is capable of providing, wherein the compensation voltage range is a compensation voltage range required for compensating transistors and/or active light-emitting devices of the display apparatus.

15. A non-transitory computer-readable storage medium having stored thereon computer program instructions that, when run on a processor, cause the processor to perform one or more steps in the method for improving image display quality according to claim 1.

16. A timing controller, comprising:

a data analysis circuit configured to divide a total gray scale range of a gamma voltage curve of a display apparatus to obtain a plurality of gray scale ranges, and obtain data of gray scales of at least one frame of image to be displayed by the display apparatus;

a ratio calculation circuit coupled to the data analysis circuit and configured to calculate a ratio of data of gray scales in each gray scale range to the data of gray scales of the at least one frame of image to be displayed; and a gamma voltage calculation circuit coupled to the ratio calculation circuit, wherein the gamma voltage calculation circuit is configured to: adjust a division value of a gamma voltage range corresponding to each gray scale range of the gamma voltage curve according to the calculated ratio, so that a division value of a gamma voltage range corresponding to a gray scale range with a maximum ratio is less than a division value of a gamma voltage range corresponding to any remaining gray scale range; and output gamma voltages corresponding to the data of gray scales of the at least one frame of image to be displayed according to the adjusted gamma voltage curve;

wherein that the gamma voltage calculation circuit is configured to adjust the division value of the gamma voltage range corresponding to each gray scale range of the gamma voltage curve according to the calculated ratio so that the division value of the gamma voltage range corresponding to the gray scale range with the maximum ratio is less than the division value of the gamma voltage range corresponding to any remaining gray scale range, includes:

determining the gray scale range with the maximum ratio from the calculated ratios;

calculating reference gamma voltages of two end points corresponding to gray scale coordinates of two end points in the gray scale range with the maximum ratio; and calculating the division value of the gamma voltage range corresponding to the gray scale range with the maximum ratio according to a difference between the reference gamma voltages of two end points corresponding to the gray scale range with the maximum ratio and a difference between the gray scale coordinates of two end points in the gray scale range with the maximum ratio.

17. The timing controller according to claim 16, further comprising:

a luminance conversion circuit configured to convert each of the data of gray scales of the at least one frame of image to be displayed into luminance data; and a data voltage output circuit coupled to the luminance conversion circuit and the gamma voltage calculation circuit, wherein the data voltage output circuit is configured to output a data voltage corresponding to each of the data of gray scales of the at least one frame of image to be displayed according to the gamma voltage and the luminance data corresponding to each of the data of gray scales of the at least one frame of image to be displayed.

18. A display apparatus, comprising:

a display panel; and the timing controller according to claim 16, wherein the timing controller is coupled to the display panel; the timing controller is configured to receive the data of gray scales of the at least one frame of image to be displayed by the display apparatus, and output a plurality of data voltages and a plurality of gamma voltages according to the data of gray scales of the at least one frame of image to be displayed.

19. A method for improving image display quality, comprising:

dividing a total gray scale range of a gamma voltage curve of a display apparatus to obtain a plurality of gray scale ranges;

obtaining data of gray scales of at least one frame of image to be displayed by the display apparatus, and calculating a ratio of data of gray scales in each gray scale range to the data of gray scales of the at least one frame of image to be displayed;

adjusting a division value of a gamma voltage range corresponding to each gray scale range of the gamma voltage curve according to the calculated ratio, so that a division value of a gamma voltage range corresponding to a gray scale range with a maximum ratio is less than a division value of a gamma voltage range corresponding to any remaining gray scale range; and outputting gamma voltages corresponding to the data of gray scales of the at least one frame of image to be displayed according to the adjusted gamma voltage curve;

wherein calculating the ratio of the data of gray scales in each gray scale range to the data of gray scales of the at least one frame of image to be displayed includes:

setting a weight value corresponding to each gray scale range;

counting a reference quantity of the data of gray scales in each gray scale range;

calculating a weighted value of the data of gray scales in each gray scale range and a sum of weighted values corresponding to the gray scale ranges, according to the reference quantity of the data of gray scales in each gray scale range and the weight value corresponding to the gray scale range; and calculating the ratio of the data of gray scales in each gray scale range according to the weighted value of the data of gray scales in each gray scale range and the sum of the weighted values.

* * * * *